(12) United States Patent
Sudou et al.

(10) Patent No.: US 6,337,561 B1
(45) Date of Patent: Jan. 8, 2002

(54) APPARATUS FOR STABILIZING A POWER SYSTEM ADAPTED TO GENERATING SYSTEMS

(75) Inventors: Yoshinari Sudou; Akira Takeuchi, both of Kuwana; Yoshinobu Mitani, Nagoya; Mamoru Kawasaki, Kasugai; Mikihito Andou, Nagoya; Kaiichirou Hirayama, Hachioji; Yoichi Uemura, Kawasaki; Nobuo Fukushima, Yokohama; Toshiaki Sogabe, Fuchu, all of (JP)

(73) Assignees: Chubu Electric Power Co., Inc., Nagoya; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/615,778

(22) Filed: Jul. 13, 2000

Related U.S. Application Data

(63) Continuation of application No. PCT/JP99/00087, filed on Jan. 13, 1999.

(30) Foreign Application Priority Data

Jan. 13, 1998 (JP) ............................................ 10-005043

(51) Int. Cl.⁷ .......................... H02K 17/28; H02H 7/09; H02H 7/093; H02H 9/00
(52) U.S. Cl. ................................ 322/19; 322/6; 322/20
(58) Field of Search ............................. 322/19, 21, 58, 322/29, 32; 290/52

(56) References Cited

U.S. PATENT DOCUMENTS 4,426,613 A * 1/1984 Mizuno et al. ............... 322/21
4,701,689 A * 10/1987 Yuan et al. .................... 322/19
4,741,023 A * 4/1988 Lawson ...................... 379/106
4,908,565 A * 3/1990 Cook et al. ................... 322/10

(List continued on next page.)

FOREIGN PATENT DOCUMENTS

| JP | 59-169396 | 9/1984 |
| JP | 62-135299 | 6/1987 |

(List continued on next page.)

OTHER PUBLICATIONS

Y. Ooura, et al., Proceedings of the Seven Annual Conference of Power and Energy Society, 8 pages, "Development of Pulse PPS for Wide Area Power Oscillation Damping," Aug. 7–9, 1996.

(List continued on next page.)

*Primary Examiner*—Nestor Ramirez
*Assistant Examiner*—Julio Gonzalez Ramirez
(74) *Attorney, Agent, or Firm*—Oblon, Spivak, McClelland, Maier & Neustadt, P.C.

(57) ABSTRACT

A generating system having a rotating type generator to interconnect a power system in order to output power of the generator to the power system comprises a generator, an exciting circuit and an excitation control section. It also comprises short-cycle stabilizing sections for outputting a short-cycle stabilizing signal for suppressing short-cycle power fluctuations according to at least one of an electric parameter and a mechanical parameter of the generator and a long-cycle stabilizing section for outputting a long-cycle stabilizing signal for suppressing long-cycle power fluctuations having a cycle time longer than short-cycle power fluctuations according to the mechanical parameter of the generator. The outputs of the short-cycle stabilizing sections and the long-cycle stabilizing section are sent to the excitation control section.

7 Claims, 7 Drawing Sheets

U.S. PATENT DOCUMENTS

| | | | | |
|---|---|---|---|---|
| 4,980,629 A | * | 12/1990 | Bando et al. | 318/799 |
| 4,999,564 A | * | 3/1991 | D'Antonio et al. | 322/99 |
| 5,381,328 A | * | 1/1995 | Umezawa et al. | 363/41 |
| 5,594,350 A | * | 1/1997 | Koizumi et al. | 324/616 |
| 5,604,420 A | * | 2/1997 | Nambu | 322/19 |
| 5,698,968 A | * | 12/1997 | Takagi et al. | 322/58 |
| 5,886,417 A | * | 3/1999 | Oka et al. | 290/52 |
| 5,977,731 A | * | 11/1999 | Xia et al. | 318/147 |
| 6,107,784 A | * | 8/2000 | Nomiya et al. | 323/205 |

FOREIGN PATENT DOCUMENTS

| | | |
|---|---|---|
| JP | 63-240400 | 10/1988 |
| JP | 64-30498 | 2/1989 |
| JP | 5-122998 | 5/1993 |
| JP | 8-163782 | 6/1996 |
| JP | 8-168177 | 6/1996 |
| JP | 9-98600 | 4/1997 |

OTHER PUBLICATIONS

Y. Sudou, et al., 1998 National Convention Record IEE Japan, 5 pages, "Development of a New PSS for Long Term Power Oscillation Damping," Mar. 1998.

T. Michigami, The Transactions of the Institute of Electrical Engineers of Japan, vol. 115–B, No. 1, pp. 41–52, "The Development of a New Two–Input PSS to Control Low–Frequency Oscillation in Interconnecting Power Systems and the Study of a Low–Frequency Oscillation Model," 1995.

English Translation of International Preliminary Examination Report.

* cited by examiner

APPARATUS FOR STABILIZING A POWER SYSTEM ADAPTED TO GENERATING SYSTEMS

CROSS REFERENCE TO RELATED APPLICATIONS

This is a continuation of Application No. PCT/JP99/00087, filed Jan. 13, 1999.

This application is based upon and claims the benefit of priority from the prior Japanese Patent Application No. 10-005043, filed Jan. 13, 1998, the entire contents of which are incorporated herein by reference.

BACKGROUND OF THE INVENTION

The present invention generally relates to a generating system interconnected to a power system. More particularly, it relates to a stabilizing apparatus to be incorporated into the magnetic excitation control system of a rotating type generator such as an alternator and designed to attenuate power fluctuations and enhance the stability of the power system.

Magnetic excitation systems for exciting field circuits of generators such as alternators that are rotating type generators can be generally and roughly classified into AC excitation systems, DC excitation systems and static excitation systems. The AC excitation system uses an AC exciter. The DC excitation system uses a DC exciter. The static excitation system uses a semiconductor switching element such as a thyristor.

A thyristor excitation system, which is a typical static excitation system being popularly used at present as excitation system, will be described below. Also, a power stabilizing system (PSS) adapted to be used in a thyristor excitation system will be explained.

FIG. 1 is a block diagram of an excitation system using a conventional PSS that can effectively attenuate power fluctuations of generator mode (power fluctuations of a short cycle of about 1 to 2 seconds).

As shown in FIG. 1, the generator excitation control system receives an input an AVR reference voltage 2 (hereinafter referred to as "90OR") and the output of transformer 3 (hereinafter referred to as "PT") operating an instrument to an automatic voltage regulator 4 (hereinafter referred to as "AVR") in order to maintain at a constant value the terminal voltage of generator 1 connected to a turbine T. The AVR reference voltage 2 serves to establish a generator voltage. The potential transformer 3 detects the generator voltage. The AVR 4 operates to control the generator voltage.

PSS 5 is provided to produce the generator 1 operate on a stable basis. The output signal of the PSS is input to the AVR 4 and used in the operation of controlling the generator voltage. The field voltage of the generator 1 is thereby regulated to control the transient active power of the generator 1 in order to suppress power fluctuations.

An excitation transformer 6 is arranged to get an excitation source out of the voltage of the generator 1. The output voltage of the excitation transformer 6 is input to a thyristor bridge 7. The field voltage of the generator 1 is modified to regulate the generator voltage according to the value set by said 90 R 2 by controlling the ignition angle of the thyrister bridge 7.

The PSS 5, which is currently commercially available, detects the active power P8 of the generator 1 from the generator voltage detected by the PT 3 and the generator current detected by the CT. The PSS 5 then detects and calculates a change $\Delta P$ in the active power P8, a change $\Delta \omega$ in the rotational speed $\omega 9$ of the rotor of the generator 1, or a change $\Delta f$ in the generator voltage frequency corresponding to the change in the system side frequency (not shown). The PSS may use one of these signals or two or more of the signals (hereinafter referred to as "multivariable PSS").

Of multi-variable PSSs, those of the type that use the change $\Delta P$ in the active power of the generator 1 as input and have an appropriate stabilization function (hereinafter referred to as "$\Delta P$-PSS") are most widely used at present.

The reason for this is that the change in the active power of the generator can be electrically detected and a stabilization function can be set into the PSS with ease because the PSS does not require phase compensation as much as a PSS (hereinafter referred to as "$\Delta \omega$-PSS") that uses the change $\Delta \omega$ in the rotational speed $\omega$ 9 of the rotor of the generator 1 as input, although the latter also has an appropriate stabilization function.

The multi-variable PSS 5 shown in FIG. 1 is a typical PSS adapted to cover a broader frequency band subject to power fluctuations than a $\Delta P$-PSS and a $\Delta \omega$-PSS as it comprises both a $\Delta P$-PSS and a $\Delta \omega$-PSS that can effectively suppress power fluctuations. This is why such a multi-variable PSS (hereinafter referred to as "($\Delta P+\Delta \omega$)-PSS" is used for a thyristor excitation system.

There are PSSs of other types that may also be used for thyrsitor excitation systems, including one (hereinafter referred to as "$\Delta f$-PSS") that uses a frequency signal representing either the voltage or the current of the generator 1 as input and also has an appropriate stabilization function) and one (hereinafter referred to as "($\Delta P+\Delta \omega$)-PSS") that comprises both a $\Delta P$-PSS and a $\Delta \omega$-PSS.

Various PSSs as described above may also be used for AC/DC excitation systems.

The excitation system further comprises an excessive-excitation limiting device for preventing excessive excitation of the generator 1, an inadequate-excitation limiting device for limiting inadequate excitation of the generator 1, a V/F controlling device for excessive excitation of the exciting transformer 6 or the armature winding of the generator 1, and the like, where V represents the generator voltage and F represents the generator frequency.) However, these devices do not exert any direct influence on the operation of the PSS 5 and, therefore, only the AVR 4 and the PSS 5 are discussed here in detail.

Both analog hardware and digital hardware are commercially available. The AVR 4 and the multi-variable PSS 5 are applicable to hardware of either type in functional terms.

While various types of excitation systems are available as pointed out above, the one shown in FIG. 1 is of the type that is mainly used at present. Therefore, the prior art technologies will be discussed below by way of this excitation system.

FIG. 2 is a block diagram of a conventional AVR 4, illustrating its configuration. Referring to FIG. 2, PSS output signal 5A of multi-variable PSS 5 is input to the AVR 4. Adder A1 adds the PSS output signal 5A to the outcome of the computation for determining the deviation of the generator voltage Vg3A as detected by PT3 from the 90R 2. The signal $\Delta V70$ obtained as a result of the addition is input to a voltage control section 11 operating on the basis of a gain and an advance/delay to be used to stabilize the voltage control loop.

The output of the voltage control section 11 is equivalent to the field voltage Efd 12 of the generator 1.

FIG. 3 is a schematic block diagram of a known multi-variable PSS 5. As shown in FIG. 3, the change $-\Delta P$ in the active power is made to pass through a stabilization function Gp(S) 13, while the change $\Delta\omega$ 9A in the rotational speed $\omega$ 9 of the generator 1 is made to pass through a stabilization function Gw(S) 14 before they are added by adder A2. The sum of the addition is input from an output limiter 15 to the AVR 4 as PSS output signal 5A. The stabilization functions Gp(S) 13 and G(w) 14 can remove noise from the input signal by passing the latter through a reset filter 16, an advance/delay circuit 17 and a limiter 18, as shown in FIG. 4.

Due to the above described functional features, the multi-variable PSS 5 can eliminate any steady-state deviations for AVR control that arises when no power fluctuation occurs and correct the phase to output an appropriate voltage regulating signal.

Meanwhile, in recent years, the stability of power system is threatened than ever as the power system increases in scale. As a result, there occur not only local fluctuations that have been a main problem and are short-cycle fluctuations lasting for about 1 second but also inter-system fluctuations that are long-cycle fluctuations lasting for about 2 to 3 seconds.

The $\Delta P$-PSS that is used in many generators in service at present effectively suppresses the local fluctuation.

The $(\Delta P+\Delta\omega)$-PSS is also used in many generators to suppress the long-cycle power fluctuation. It is reported that the $(\Delta P+\Delta\omega)$-PSS effectively raises the level of power that can be supplied on a stable basis. (See "Development of Pulse PSS for Suppressing Power Fluctuations in a Broad Area," Meeting of Power and Energy Department, Society of Electricity, 1996, "Development of Multi-PSS for Suppressing Long-Cycle Fluctuation in Interconnected Systems," Theory of Electricity B, Voltage. 115-B, No. 1, 1995.) As the amount of interchange power increases among power companies, the cycle period of long-cycle power fluctuations increases and it has become difficult for the existing PSS to suppress long-cycle power fluctuations.

Efforts are being made to interchange power among power companies to an enhanced extent in order to increase the efficiency of operation of the power plants of power companies and run the associated systems more flexibly. It is planned to interchange more power among power companies in the future. Further, as the sales of power to remote customers by IPPs (Independent Power Plants) rises along with the self delivery of power from house generators, power will be supplied over long distances on a huge scale.

Let us imagine, for example, power systems 68A, 68B and 69, each comprising a plurality of generators G and a load, may be interconnected by power transmission lines 60A and 60B. Then, power may be supplied from the power system 68A to the power system 68B over a long distance through the lines 60A and 60B.

With such an arrangement, more power will be expectedly supplied from the power system 68A to the power system 68B than ever within a period of several years from now.

When this expected increase in the amount of power interchanged among power companies is taken into consideration, it seems difficult for the $(\Delta P+\Delta\omega)$-PSS to maintain the stability of the power systems when large scale power fluctuations result from a severe accident such as three-phase earth fault induced by thunderbolt. Then, it will not possible for the $(\Delta P+\Delta\omega)$-PSS to control power fluctuations of generator mode developing in the power systems 68A, 68B and 69. Nor will it be possible for the $(\Delta P+\Delta\omega)$-PSS to control power fluctuations of system mode developing between the power systems 68A and 68B. In other words, the limit to interchange power is defined by the limit to which the stability of the power systems can be maintained.

FIG. 6 is a graph illustrating the outcome of a stability simulation conducted on the assumption that an accident occurred as a result of a three-phase earth fault of a power system providing service over a broad area, involving long-distance power transmission. The simulation shows the waveform of fluctuating power that appears after the accident if a known PSS is used. The cycle of fluctuation of power caused by the accident is about 5.5 seconds. The power fluctuation remains even 40 seconds after the accident to prove it is almost getting to the stability limit. If the level of interchange power is raised under this condition, the power systems will no longer be able to secure its stability.

As pointed out above, it is known that fluctuating power occurs in generator mode and also system mode. More specifically, fluctuating power can appear in generator mode among the generators of a same power company with a cycle of about 1 second and also in system mode among the generators of different power companies with a long cycle (of about 2 to 10 seconds). Thus, it is necessary to develop a new large PSS that can effectively suppress power fluctuations in both modes.

While the $\Delta P$-PSS that uses a change $\Delta P$ in the active power of a generator as a stabilizing signal is incorporated in many plants at present, it is theoretically adapted to suppress power fluctuations that last for about 1 second or less (between 0.5 seconds and 1 second).

However, it can hardly suppress long-lasting system-mode power fluctuations that continue for about 2 to 10 seconds.

On the other hand, the $\Delta\omega$-PSS that uses a change $\Delta\omega$ in the rotational speed of the rotor of the generator 1 as a stabilizing signal can effectively suppress long-lasting system-mode power fluctuations that continue for about 2 seconds.

The $\Delta f$-PSS that uses a change $\Delta f$ in the frequency as a stabilizing signal tends to operate almost in the same way as the $\Delta\omega$-PSS.

At present, a combination of the $\Delta P$-PSS and the $\Delta\omega$-PSS, i.e., the $(\Delta P+\Delta\omega)$-PSS, is employed for the purpose of suppressing power fluctuations that last for about 0.5 seconds to about 2 seconds. Actually, this system works effectively.

However, as more power is interchanged among power companies, long-lasting power fluctuations that continue for about 2 seconds or more occur more frequently and the period of power fluctuations becomes longer as a function of the amount of interchange power. The $(\Delta P+\Delta\omega)$-PSS can suppress power fluctuations lasting for about 2 second or more only with low efficiency.

The exciting systems for generators that operate together with power systems, are roughly classified into two types, i.e., static excitation system and rotary exciting system. The thyristor exciting system is a typical static exciting system, whereas AC exciter is a typically rotary exciting system.

The object of the present invention is to provide a PSS that can quickly suppress power fluctuations that may usually occur over a broad cycle zone, ranging from fluctuations of generator mode (having a short cycle of about 0.5 seconds) to fluctuations of system mode (having a long cycle of about 10 seconds), in order to stabilize power systems and secure power interchange over a broad area on a stable basis and is applicable to both a static exciting system and a rotary exciting system, without adversely affecting the shaft-twisting vibration of the turbines or generators.

BRIEF SUMMARY OF THE INVENTION

The above object of the present invention is achieved by providing a generating system having a rotating type generator to interconnect a power system in order to output power of the generator to the power system, the generating system comprising:

an exciting circuit for exciting the field circuit of the generator;

an excitation control section for controlling the excitation of the exciting circuit in order to regulate the output of the generator;

a short-cycle stabilizing section for outputting a short-cycle stabilizing signal for suppressing short-cycle power fluctuations in accordance with at least one of an electric parameter and a mechanical parameter of the generator;

a long-cycle stabilizing section for outputting a long-cycle stabilizing signal for suppressing long-cycle cycle power fluctuations having a cycle time longer than short-cycle power fluctuations in accordance with the mechanical parameter of the generator; and an output section for outputting the output of the short-cycle stabilizing section and that of the long-cycle cycle stabilizing section to the excitation control section.

In another aspect of the invention, there is also provided an apparatus for stabilizing a power system to be incorporated into the magnetic excitation control system of a rotating type generator in order to quickly attenuate power fluctuations and enhance the stability of the power system, the apparatus comprising:

a short-cycle stabilizing section for computationally determining a short-cycle stabilizing signal for suppressing short-cycle power fluctuations in accordance with at least one of an electric parameter and a mechanical parameter of the generator;

a long-cycle stabilizing section for computationally tationally determining a long-cycle stabilizing signal for suppressing long-cycle power fluctuations having a cycle time longer than short-cycle power fluctuations according to the mechanical parameter of the generator; and an adding section for applying the output of the short-cycle stabilizing section and that of the long-cycle stabilizing section to the magnetic excitation control system.

While a rotating type generator according to the invention may typically be an alternator that can normally be used for a hydraulic power system, a thermal power system or an atomic power system, it can also be used for a generator-motor or an induction generator having distributed winding that is designed to be applicable to a pumping-up power system.

The electric parameter of the generator to be used for generating a short-cycle stabilizing signal and/or a long-cycle stabilizing signal may be an active power signal of the generator, a voltage signal of the generator or a signal equivalent to it, a current signal of the generator or a signal equivalent to it, a voltage frequency signal of the generator or a signal equivalent to it or a current frequency signal of the generator or a signal equivalent to it.

The mechanical parameter of the generator may be a rotational speed signal of the rotor of the generator or a signal equivalent to it, a phase angle signal of the rotor of the generator or a signal equivalent to it, an guide vane opening signal of the water wheel linked to the generator or a valve opening signal of the turbine coupled to the generator.

Thus, according to the invention, it is now possible to secure power interchange over a broad area on a stable basis by quickly suppressing power fluctuations that may usually occur over a broad cycle zone, ranging from short-cycle fluctuations (of generator mode) to long-cycle fluctuations (of system mode), thereby stabilizing power systems.

In still another aspect of the invention, there is also provided a generating system having a rotating type generator to interconnect a power system in order to output power of the generator to the power system, the generating system comprising:

an exciting circuit for exciting the field circuit of the generator;

an excitation control section for controlling the excitation of the exciting circuit in order to regulate the output of the generator;

a long-cycle stabilizing section for outputting a long-cycle stabilizing signal for suppressing long-cycle power fluctuations having a cycle time longer than short-cycle power fluctuations in accordance with a mechanical parameter of the generator; and an output section for outputting the output of the long-cycle stabilizing section to the excitation control section.

In still another aspect of the invention, there is also provided an apparatus for stabilizing a power system to be incorporated into the magnetic excitation control system of a rotating type generator in order to quickly attenuate power fluctuations and enhance the stability of the power system, the apparatus comprising:

a long-cycle stabilizing section for computationally determining a long-cycle stabilizing signal for suppressing long-cycle power fluctuations according to the mechanical parameter of the generator.

Thus, according to the invention, it is now possible to secure power interchange on a stable basis by quickly suppressing long-cycle power fluctuations (of system mode), thereby stabilizing power systems. Differently stated, the generator mode practically does not give rise to any problem when there is no adjacently located generator or when a plurality of generators transmit power to a remote load by way of a system impedance so that it is only necessary to suppress power fluctuations of system mode. Then, the above described arrangement of PSS can effectively suppress power fluctuations of system mode as it comprises a long-cycle stabilizing section for computationally determining a long-cycle stabilizing signal.

While a rotating type generator according to the invention may typically be an alternator that can normally be used for a hydraulic power system, a thermal power system or an atomic power system, it can also be used for a generator-motor or an induction generator having distributed winding that is designed to be applicable to a pumping-up power system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described below, by referring to the accompanying drawing.
(First Embodiment)

Figure 1:
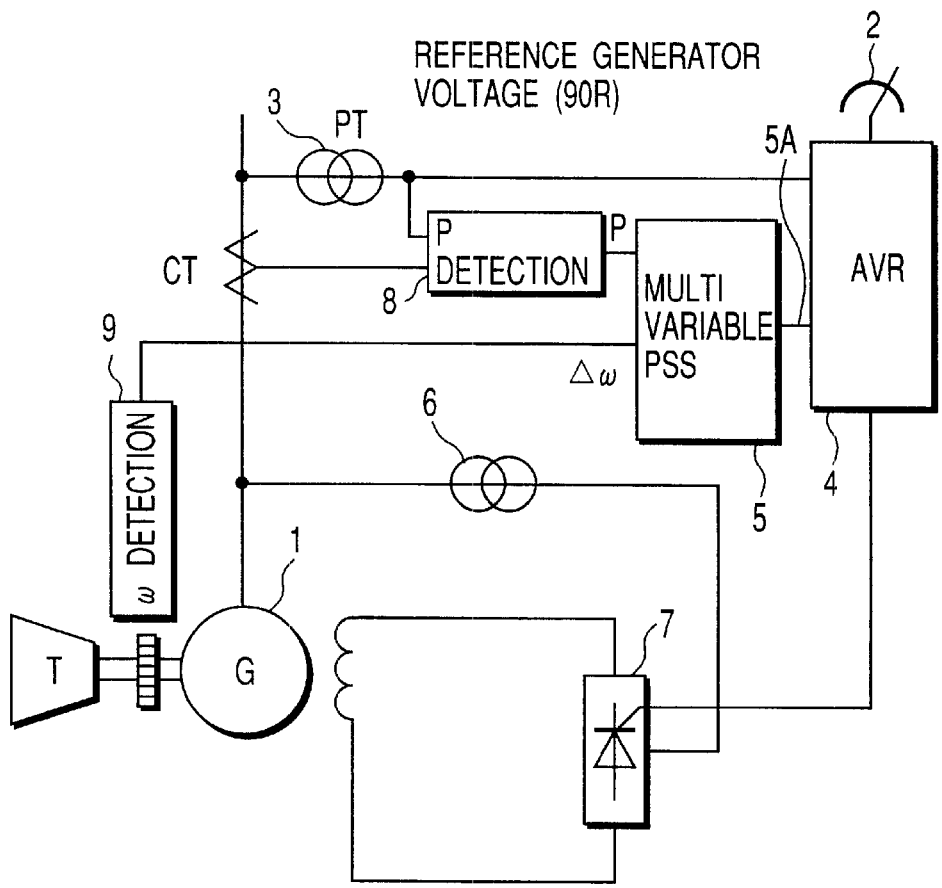
FIG. 1 is a block diagram illustrating the configuration of an exciting system using a conventional PSS that can effectively suppress power fluctuations of generator mode.
Figure 8:
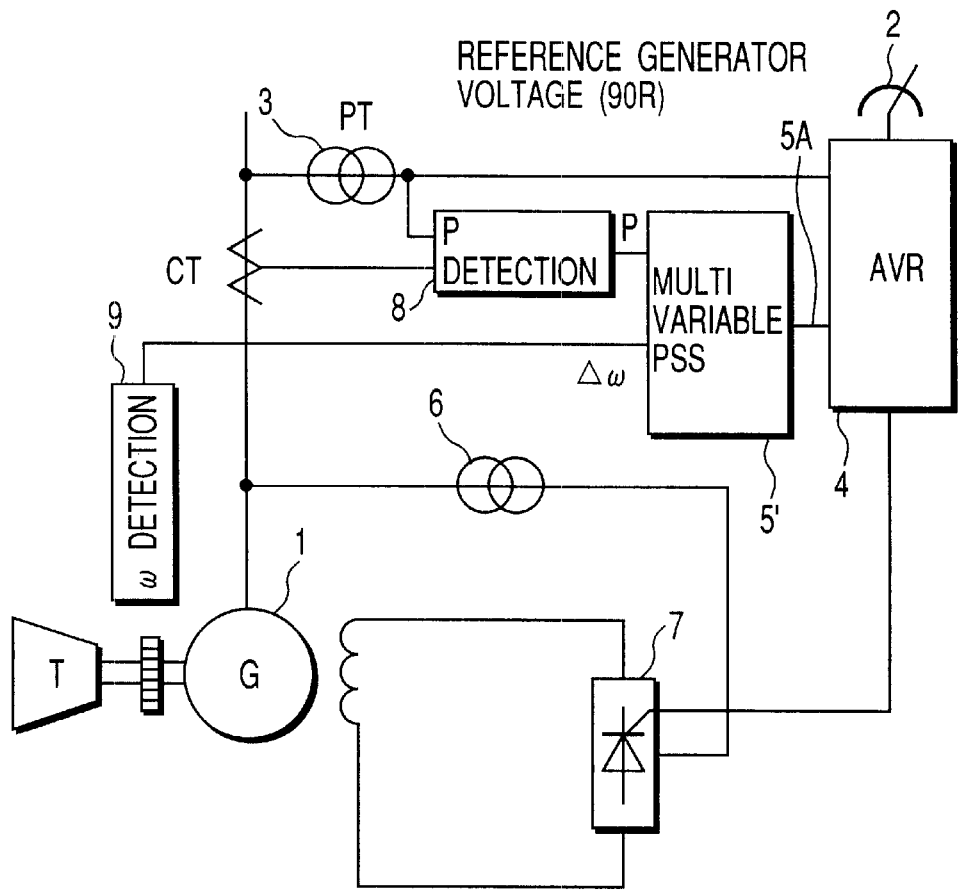
FIG. 8 is a block diagram illustrating the configuration of an exciting system using a PSS according to this invention.

FIG. 8 is a block diagram illustrating the configuration of an exciting system using a PSS according to this invention. The components identical to those shown in FIG. 1 are denoted respective by the same reference numerals and will not be described any further. Only the components different from those shown in FIG. 1 will be described below.

As shown in FIG. 8, the exciting system of this embodiment comprises a multiple PSS 5', instead of the multi-variable PSS 5 shown in FIG. 1.

Figure 3:
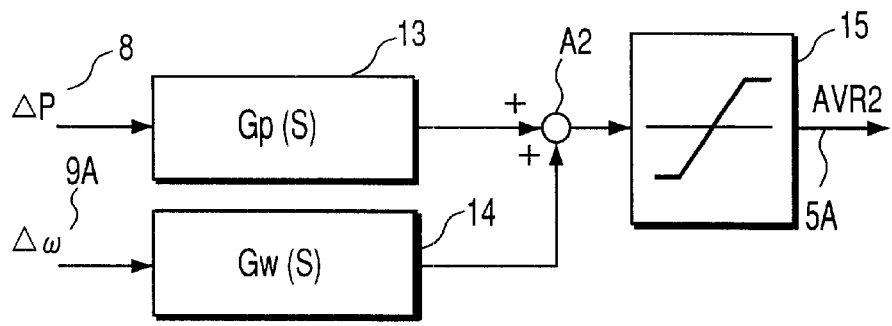
FIG. 3 is a block diagram illustrating the configuration of a conventional multivariable PSS 5.
Figure 9:
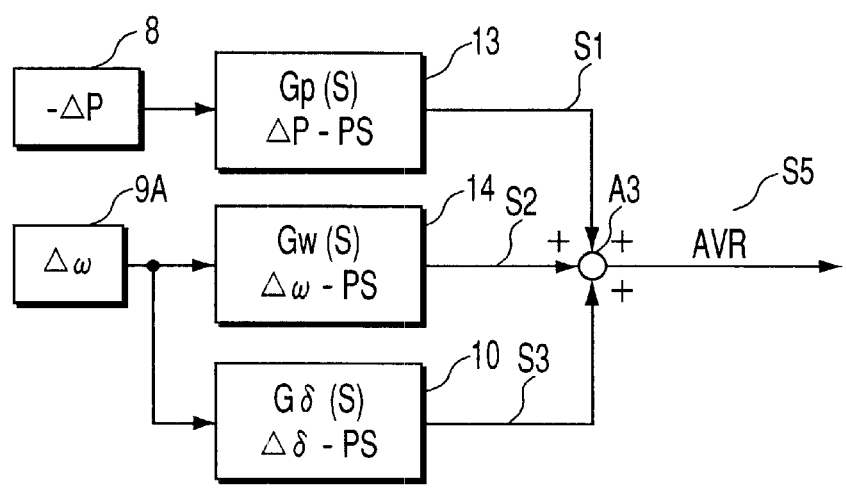
FIG. 9 is a block diagram illustrating the configuration of a multiple PSS 5', which is the first embodiment of the invention.

FIG. 9 is a block diagram illustrating the configuration of a multiple PSS 5' according to the present embodiment. The components identical to those shown in FIG. 3 are denoted respectively by the same reference numerals.

As illustrated in FIG. 9, the multiple PSS 5' comprises a ΔP-PSS, a Δω-PSS, a Δδ-PSS, and an adder A3. The ΔP-PSS is a conventional PSS adapted to receive, as input, the change −ΔP in the active power P8 of the generator 1 and having appropriate stabilization function Gp(S) 13 in order to suppress power fluctuations of generator mode showing a short cycle. The Δω-PSS is also a conventional PSS adapted to receive, as input, the change Δω 9A in the rotational speed ω 9 of the rotor of the generator 1 and having appropriate stabilization function Gw(S) 14 in order to suppress power fluctuations of generator mode showing a short cycle. The Δδ-PSS is a PSS adapted to receive, as input, the change Δω 9A in the rotational speed ω 9 of the rotor of the generator 1 and has stabilization function Gδ(S) 10 for compensating the phase advance/delay in order to put the phase of the phase angle signal of the rotor of the generator 1 in phase with the input signal. The adder A3 is adapted to add the output signal S1 of the ΔP-PSS, the output signal S2 of the Δω-PSS and the output signal S of the Δδ-PSS. The multiple PSS 5' is adapted to input its output signal S5 produced from the adder A1 to the AVR 4.

The ΔP-PSS having the stabilization function Gp(S) 13 and the Δω-PSS having the stabilization function Gw(S) 14 are combined into a (ΔP+Δω)-PSS, which operates as section for calculating a short-cycle stabilizing signal. The Δε-PSS having the stabilization function Gδ(S) 10 operates as section for calculating a long-cycle stabilization signal.

While FIG. 9 does not show the limiters provided for limiting the effective range of controlling the generator voltage, they may be incorporated in the ΔP-PSS having the stabilization function Gp(S) 13, the Δω-PSS having the stabilization function Gw(S) 14, and the Δδ-PSS having the stabilization function Gδ(S) 10, respectively. Alternatively, a single limiter may be provided to limit the output signal S5 of the multiple PSS.

Figure 4:
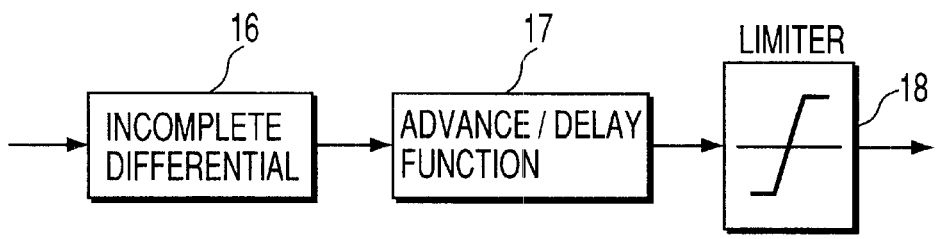
FIG. 4 is a block diagram illustrating the stabilization functions Gp(S) 13 and G(w) 14 provided in the multivariable PSS of FIG. 3.
Figure 5:
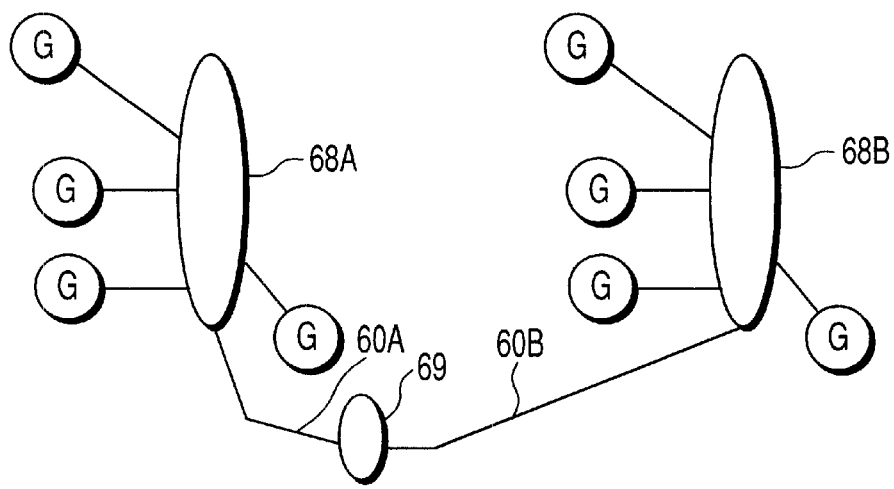
FIG. 5 is a diagram illustrating a long-distance power transmission system that comprises a plurality of generators and a plurality of loads.

The stabilization functions Gp(S) 13, Gw(S) 14 and Gδ(S) 10 of the three PSSs mentioned above same as those illustrated in FIG. 4. The formulas (1), (2) and (3) shown below are examples that can be used respectively for these stabilization functions.

$$Gp = \frac{Kp \cdot Tp1S(1 + Tp2S)(1 + Tp3S)}{(1 + Tp1S)(1 + Tp4S)(1 + Tp5S)} \quad \text{(formula 1)}$$

$$Gw = \frac{Kw \cdot Tw1S(1 + Tw2S)(1 + Tw3S)(1 + Tw4S)}{(1 + Tw1S)(1 + Tw5S)(1 + Tw6S)(1 + Tw7S)} \quad \text{(formula 2)}$$

$$G\delta = \frac{K\delta \cdot T\delta1S(1 + T\delta2S)(1 + T\delta3S)(1 + T\delta4S)}{(1 + T\delta1S)(1 + T\delta5S)(1 + T\delta6S)(1 + T\delta7S)} \quad \text{(formula 3)}$$

Figure 2:
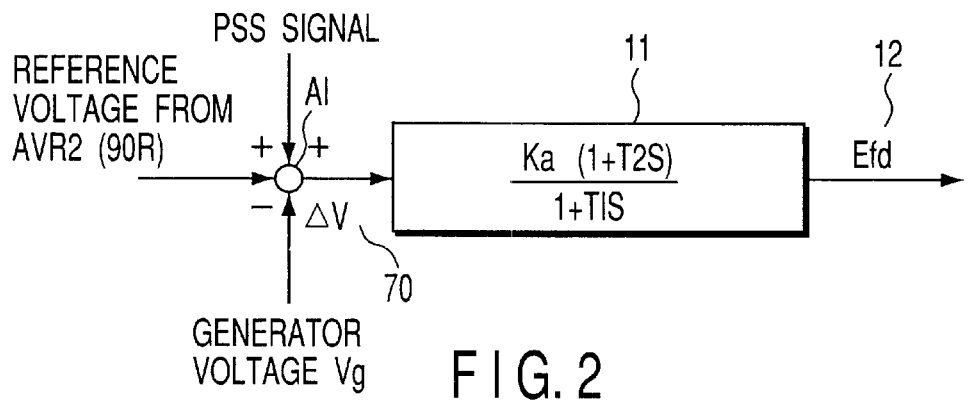
FIG. 2 is a block diagram illustrating the configuration of a conventional AVR 4.

This embodiment of multiple PSS 5' according to the present embodiment and having the above described configuration operates in a manner as described below. Note, however, that the description of the components same as those illustrated in FIGS. 1 and 2 is omitted and the operation of the components other than those shown in FIGS. 1 and 2 will be described below.

In the multiple PSS 5', the change −ΔP in the active power P8 of the generator 1 is supplied to the adder A3 by way of the stabilization function Gp(S) 13, as shown in FIG. 3, while the change Δω 9A in the rotational speed ω 9 of the generator 1 is also supplied to the adder A3 by way of the stabilization functions Gw(S) 14 and Gδ(S) 10. The adder A3 then adds these changes to generate PSS output signal 5A. The PSS output signal 5A is input to the AVR 4.

With this arrangement, the (ΔP+Δω)-PSS that is a conventional PSS realized by combining the ΔP-PSS and Δω-PSS having stabilization functions Gp(S) 13 and Gw(S) 14, respectively are adapted to suppress power fluctuations of adjacent generator mode and power fluctuations of generator mode that can occur a cross compound generating system or a generating system having low-voltage synchronous generators connected directly to each other with a short-cycle of 2 Hz, lasting only for 0.5 seconds. On the other hand, the Δδ-PSS that is a parallel type PSS having the stabilization function Gδ(S) 10 is adapted to suppress power fluctuations of system-mode. With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

Figure 6:
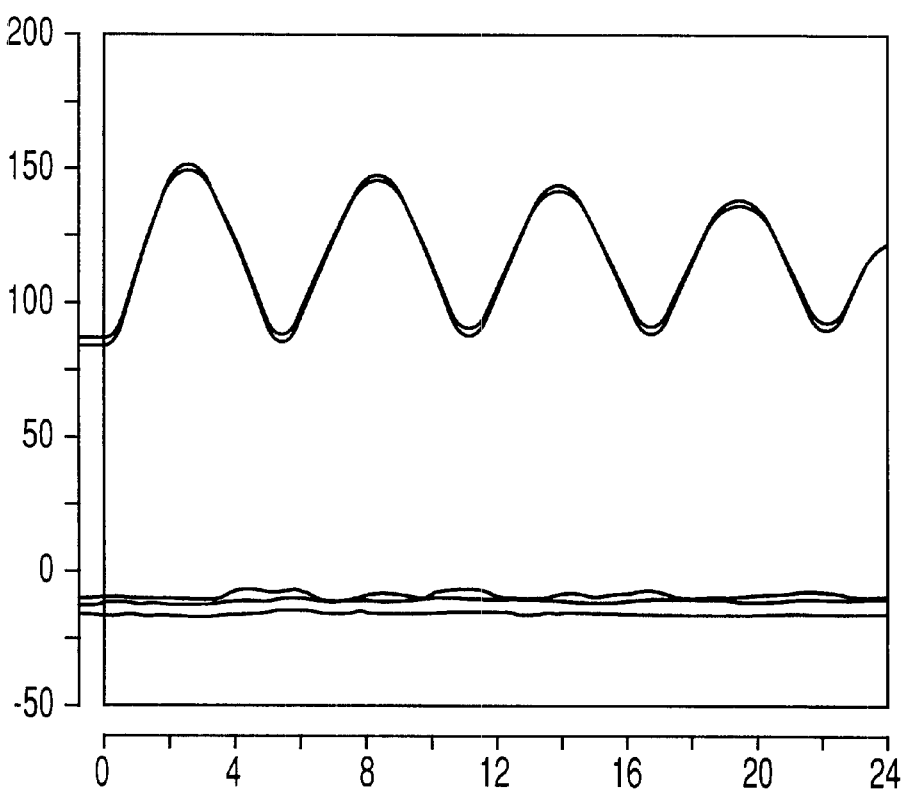
FIG. 6 is a graph illustrating the outcome of a stability simulation conducted on the assumption that an accident occurred as a result of a three-phase earth fault of a power system providing service over a broad area, involving long-distance power transmission.
Figure 10:
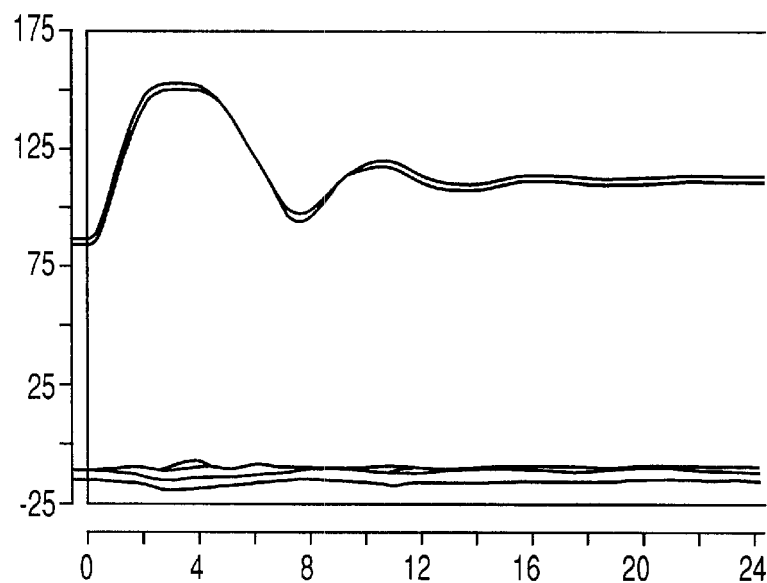
FIG. 10 is a graph illustrating the outcome of a stability simulation conducted on a long-distance, broad-area power transmission by the use of the multiple PSS 5' of the first embodiment.

FIG. 10 is a graph obtained as a result of a stability simulation of a long-distance broad-area power transmission system, comprising the embodiment of multiple PSS 5' according to the invention as shown in FIG. 9. The PSS 5' was operated in the same conditions as shown in FIG. 6 that summarily shows the outcome of the simulation conducted by the using a conventional PSS. In FIG. 10, time (in seconds) is plotted on the abscissa, and phase angle δ (in decrees) is plotted on the ordinate.

The multiple PSS 5' used in the simulation, a result of which is shown in FIG. 10, has the following constants:

$$\Delta P - PSS \text{ corresponding to (Equation 1)} = \frac{0.8 \times 5S}{1 + 5S}$$

$$\Delta \omega - PSS \text{ corresponding to (Equation 2)} = \frac{15 \times 10S}{1 + 10S}$$

$$\Delta \delta - PSS \text{ corresponding to (Equation 3)} = \frac{100(20S)(1 + 3S)}{(1 + 10S)(1 + 20S)}$$

$$(1 + 0.02S)$$

These constants are changed if they differ from the constants, or conditions, selected for the generator 1 and AVR 4 used in the above-mentioned simulation.

Assume that the output capacity of all the generators used in the simulation is 100%. Then, the ratio of the generator 1, for which the multiple PSS 5' is sued, is 9.4%. It will be appreciated that the stability is improved as the ratio by which the PSS of FIG. 9 is used rises. However, as seen from FIG. 10, the stability is sufficiently high to make the operation of the system practically free from problems even if the PSS is used by 9.4% the output capacity of the system.

The multiple PSS 5' shown in FIG. 9 performs well against various power fluctuations that can occur while the generator is operating, ranging from power fluctuations of system-mode resulting from disturbances such as a system failure as shown in FIG. 10 to power fluctuations of generator mode resulting from small disturbances such as a change in the load (not shown).

For example, the multiple PSS 5' according to the present embodiment may be operated as follows in an exciter system:

$$\Delta P - PSS \text{ corresponding to (Equation 1)} =$$
$$\frac{0.3 \times 5S(1 + 0.1S)(1 + 0.5S)}{(1 + 5S)(1 + 0.02S)(1 + 0.02S)}$$

$$\Delta \omega - PSS \text{ corresponding to (Equation 2)} =$$
$$\frac{8 \times 10S(1 + 0.4S)(1 + 0.06S)}{(1 + 10S)(1 + 0.02S)(1 + 0.02S)}$$

$$\Delta \delta - PSS \text{ corresponding to (Equation 3)} =$$
$$\frac{80(20S)(1 + 0.7S)(1 + 0.7S)}{(1 + 10S)(1 + 20S)(1 + 0.02S)(1 + 0.02S)}$$

Figure 7:
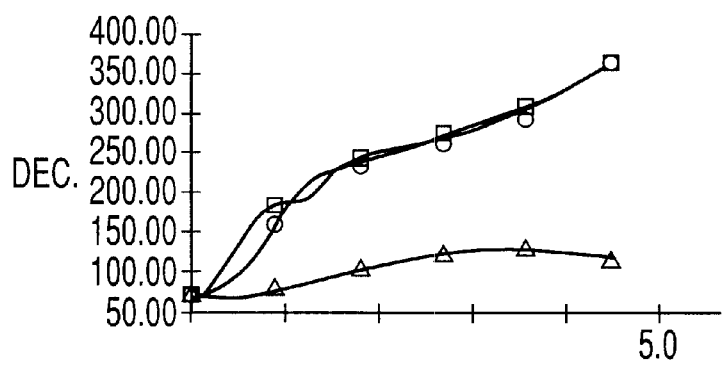
FIG. 7 is a graph showing the outcome of a stability simulation conducted only by using a conventional PSS.
Figure 11:
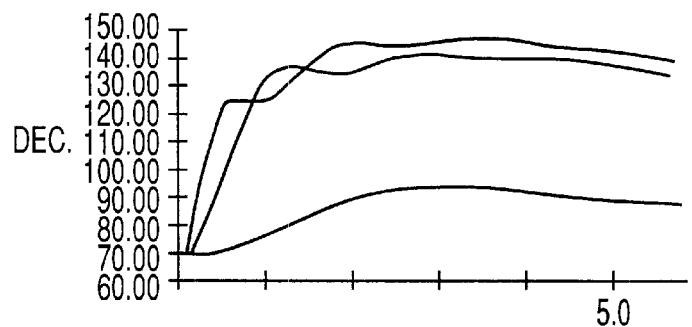
FIG. 11 is a graph illustrating the outcome of a stability simulation conducted by operating the multiple PSS 5' according to the first embodiment in an exciter system.

FIG. 11 is a graph obtained as a result of a stability simulation of the operation of the multiple PSS 5' of this embodiment in an exciter system. FIG. 7 is a graph obtained as a result of a stability simulation of the operation of only a conventional PSS. As shown in FIG. 11, the phase-angle fluctuations, i.e., the power fluctuations caused by a system failure is suppressed in about 3 seconds if the embodiment of multiple PSS 5' is used.

By contrast, the phase angle of the generator increases with time to make the power system unstable as shown in FIG. 7 if a conventional PSS is used.

As can be seen clearly from the graphs, the embodiment of multiple PSS 5' according to the present embodiment can remarkably enhance the stability of a power system if it comprises both a thyristor exciting system and an exciter system.

(Second Embodiment)

Figure 12:
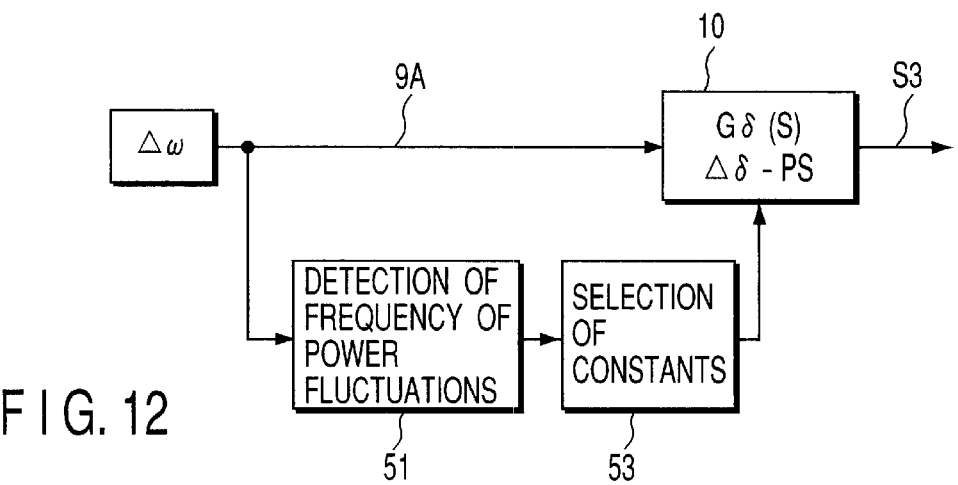
FIG. 12 is a block diagram illustrating principal components of a multiple PSS 5', which is the second embodiment of this invention.

FIG. 12 is a block diagram of a principal portion of the second embodiment of multiple PSS 5' according to the invention. The components that are identical to those shown in FIG. 9 are denoted respectively by the same reference numerals and will not explained be any further. Thus, only the components different from those shown in FIG. 9 will be described below.

As shown in FIG. 12 and if compared with the PSS 5' illustrated in FIG. 9, the multiple PSS 5' of this embodiment of the invention has two additional components including a power-fluctuation frequency detecting section 51 and a constant selecting section 53.

The power-fluctuation frequency detecting section 51 detects the frequency of power fluctuations from the change Δω 9A in the rotational speed ω 9 of the rotor of the generator 1.

The constant selecting section 53 selects control constants out of a number of constants stored in advance by taking various system conditions into consideration according to the signal of the frequency detected by the power-fluctuation frequency detecting section 51 or a signal equivalent to it.

More specifically, there is provided a table prepared in advance and including stabilization constants Kδ, Tδ1, Tδ2, Tδ3, Tδ4, Tδ5, Tδ6 and Tδ7 selected for (formula 3) above for the parallel PSS on the basis of various possible system conditions, on the one hand, and frequencies of power fluctuations corresponding to these stabilization constants, on the other hand. The constant selecting section 53 automatically selects the stabilization constants that are closely related to the detected frequency of power fluctuations out of this table. Thus, the power-fluctuation frequency detecting section 51 and the constant selecting section 53 are made to have a control-constant regulating feature.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS are automatically selected by the constant selecting section 53 out of a number of constants stored in advance by taking various system conditions into consideration in response to the frequency detected by the power-fluctuation frequency detecting section 51.

As the stabilization function 10 as shown in (formula 3) is so arranged for each parallel-type PSS adapted to receive as input the signal of the frequency of the voltage or the current of the generator 1 as to suppress the target power fluctuations most effectively in response to the power fluctuations existing in the system. In this way, each parallel-type PSS can suppress the power fluctuations for which the stabilization function is responsible.

(Third Embodiment)

Figure 13:
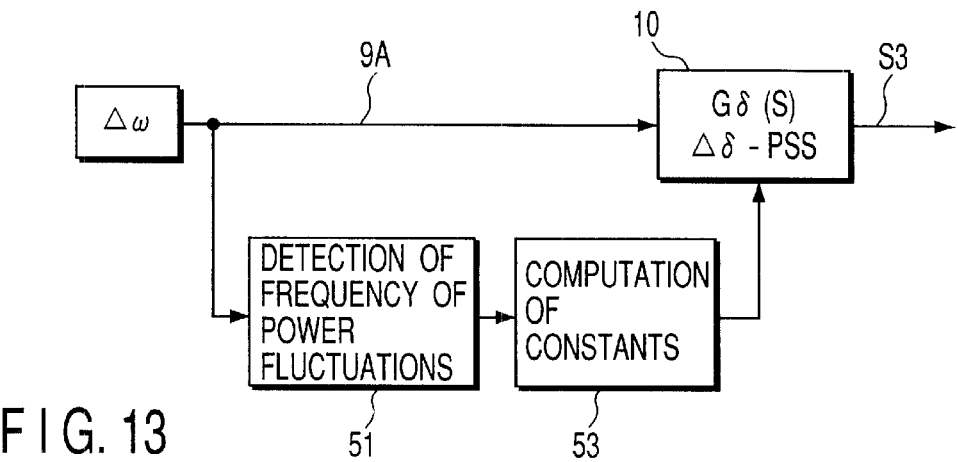
FIG. 13 is a block diagram illustrating principal components of a multiple PSS 5', which is the third embodiment of the present invention.

FIG. 13 is a block diagram of a principal portion of the third embodiment of multiple PSS 5' according to the invention. The components that are identical to those shown in FIG. 9 are denoted respectively by the same reference numerals and will not explained be any further. Thus, only the components different from those shown in FIG. 9 will be described below.

As shown in FIG. 13 and if compared with FIG. 9, the multiple PSS 5' of this embodiment of the invention has two additional components including a power-fluctuation frequency detecting section 51 and a constant computing section 54.

The power-fluctuation frequency detecting section 51 detects the frequency of power fluctuations from the change Δω 9A in the rotational speed ω 9 of the rotor of the generator 1.

The constant calculating section 54 has the function of automatically regulating control constants in order to change the stabilization function of the parallel-type PSS, using the predetermined algorithm in response to the signal of the frequency of power fluctuations detected by the power-fluctuation frequency detecting section 51 or a signal equivalent to it.

More specifically, there is provided a table prepared in advance and including stabilization constants Kδ, Tδ1, Tδ2, Tδ3, Tδ4, Tδ5, Tδ6 and Tδ7 selected for (formula 3) above for the parallel PSS on the basis of various possible system conditions, on the one hand, and frequencies of power fluctuations corresponding to these stabilization constants, on the other hand. There is also provided an approximate expression for the frequency F of power fluctuations corresponding each of the above constants. For example, the section 54 may automatically compute the constant of each parallel-type PSS by substituting F in the approximate expression of the second degree as show below with the detected value of the frequency of power fluctuations:

$$K\delta(F)=A0+A1\times F+A2\times F\times F \quad \text{(Equation 4)}$$

where A0, A1 and A2 are coefficients for the equation of the second degree.

Thus, the power-fluctuation frequency detecting section 51 and the constant computing section 54 are made to have a control-constant regulating feature.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS are automatically computed by the constant computing section 54 using the formulas provided in advance by taking various system conditions into consideration in response to the frequency detected by the power-fluctuation frequency detecting section 51.

As the stabilization function 10 as shown in (formula 3) is so arranged for each parallel-type PSS adapted to receive as input the signal of the frequency of the voltage or the current of the generator 1 as to suppress the target power fluctuations most effectively in response to the power fluctuations existing in the system. In this way, each parallel-type PSS can suppress the power fluctuations for which the stabilization function is responsible.

(Fourth Embodiment)

Figure 14:
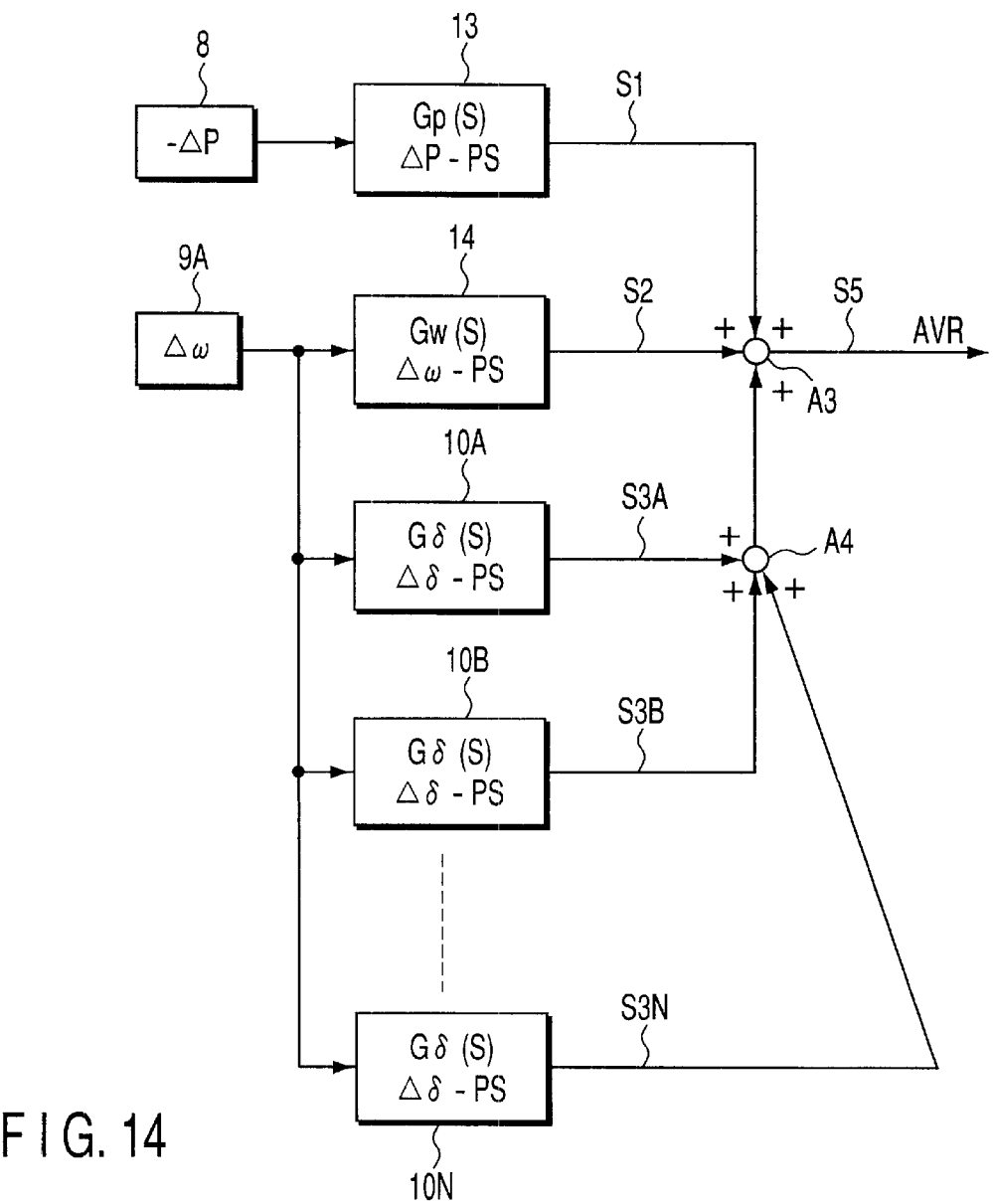
FIG. 14 is a block diagram illustrating principal components of a multiple PSS 5', which is the fourth embodiment of the invention.

FIG. 14 is a block diagram of a principal portion of the fourth embodiment of multiple PSS 5' according to the invention. The components that are identical to those shown in FIG. 9 are denoted respectively by the same reference numerals and will not explained be any further. Thus, only the components different from those shown in FIG. 9 will be described below.

As illustrated in FIG. 14, the multiple PSS 5' of this embodiment of the invention comprises a plurality of (N) Δδ-PSSs 10A through 10N that are parallel-type PSSs. Each of the Δδ-PSSs receives a signal obtained by compensating the phase delay of the change Δω 9A in the rotational speed ω 9 of the rotor of the generator 1 to make it in phase with the signal representing the phase angle of the rotor of the generator 1 and has stabilization function Gδ(S) for suppressing power fluctuations of system mode. An adder A4 is provided to add output signals S3A through S3N of the parallel-type PSSs to produce a sum signal. Another adder A3 is provided to add the sum signal and output signals S1 and S2 of the ΔP-PSS and Δω-PSS, or (ΔP+Δω)-PSS, which are PSSs of conventional type, to produce output signal S5 of the multiple PSS. The output signal S5 is then input to the AVR 4.

While FIG. 14 does not show the limiters provided for limiting the effective range of controlling the generator voltage, they may be incorporated in the ΔP-PSS having the stabilization function Gp(S) 13, the Δω-PSS having the stabilization function Gw(S) 14, and the Δδ-PSSs having the stabilization functions Gδ(S) 10A to 10N, respectively. Alternatively, a single limiter may be provided to limit the output signal S5 of the multiple PSS.

Now, the operation of the multiple PSS 5' of this embodiment having the above described configuration will described below.

Note, however, that only the operation of the part of this embodiment that is different from the first embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal of the frequency of the voltage or the current of the generator 1 as to suppress the target power fluctuations most effectively in response to the power fluctuations existing in the system. In this way, each parallel-type PSS adapted to receive as input the signal of the frequency of the voltage or the current of the generator 1 can suppress the power fluctuations for which the stabilization function is responsible.

More specifically, this multiple PSS 5' comprises a plurality of parallel-type PSSs having respective stabilization functions are differentiated to make themselves adaptable to power fluctuations existing in the system so that, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the first embodiment will be selected for the stabilization functions 10A through 10N of the parallel-type PSSs. Then, the output signals S3A through S3N of these parallel-type PSSs are added to the output signals S1, S1 of the conventional type PSS to obtain the output signal S5 of the multiple PSS that is output to the AVR 4.

Then, power fluctuations of generator mode are suppressed mainly by the ($\Delta P+\Delta\omega$)-PSS that is a PSS of conventional type realized by combining a $\Delta P$-PSS having stabilization function Gp(S) 13 and $\Delta\omega$-PSS having stabilization function Gw(S) 14, whereas power fluctuations of a plurality of system modes that are abundant in terms of number or mode are suppressed by the $\Delta\delta$-PSS that comprises a plurality of parallel-type PSSs having stabilization functions 10A through 19N.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Fifth Embodiment)

Figures 15, 16:
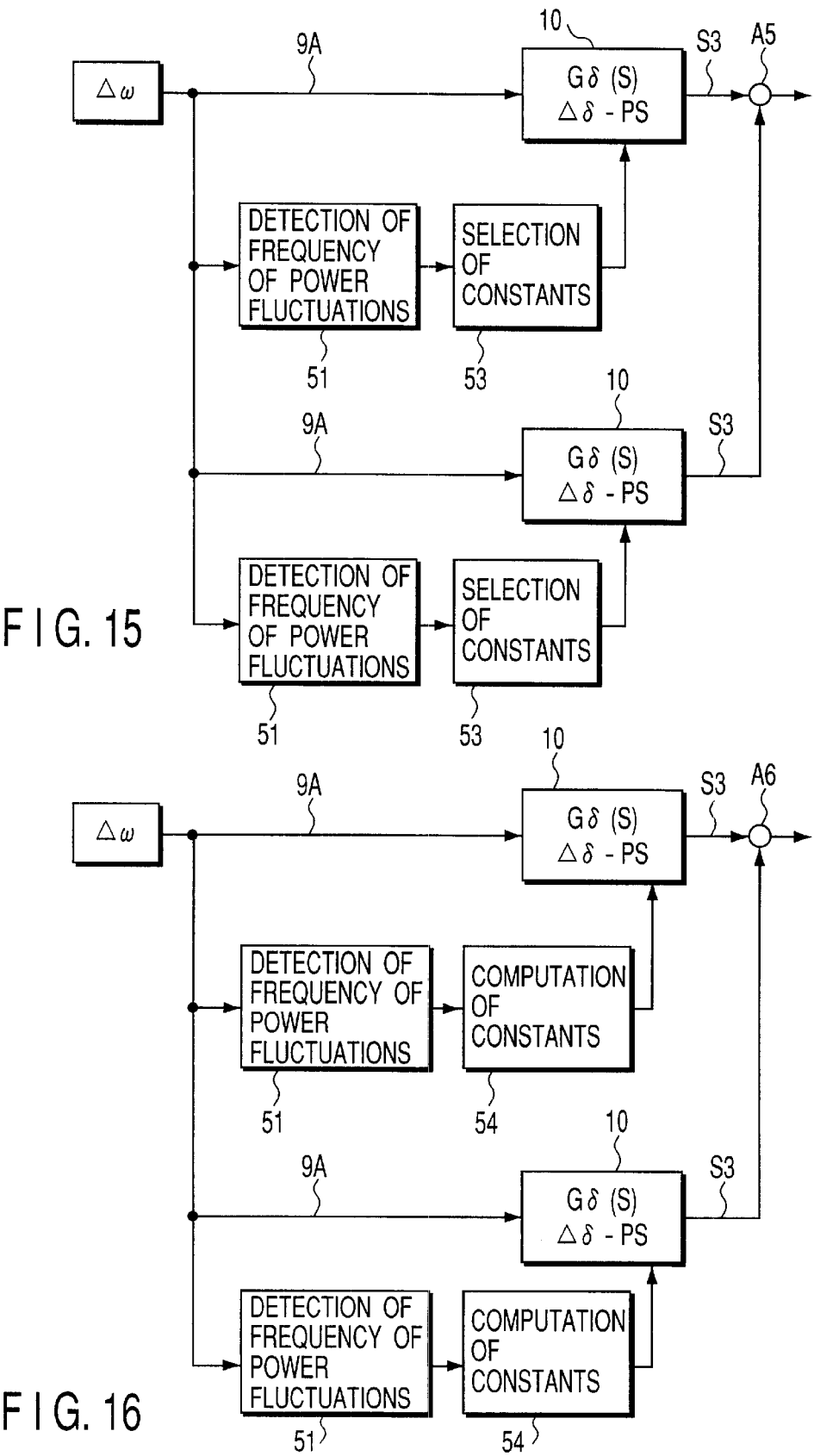
FIG. 15 is a block diagram illustrating principal components of a multiple PSS 5', which is the fifth embodiment of the present invention.
FIG. 16 is a block diagram illustrating principal components of a multiple PSS 5', which is the sixth embodiment of the invention.

FIG. 15 is a block diagram of a principal portion of the fifth embodiment of multiple PSS 5' according to the invention. The components that are identical to those shown in FIG. 12 are denoted respectively by the same reference numerals and will not explained be any further. Thus, only the components different from those shown in FIG. 12 will be described below.

As illustrated in FIG. 15, the multiple PSS 5' of this embodiment of the invention comprises a plurality of (a pair of) parallel-type PSSs. These parallel-type PSSs use either the signal of the frequency of power fluctuations detected from the change $\Delta\omega$ 9A in the rotational speed $\omega$ 9 of the rotor of the generator 1 or a signal equivalent to it. Then, they automatically select the constants most suited to the detected frequency of power fluctuations out of the constants obtained in advance by computation for the stabilization functions in response to the power fluctuations existing in the systems.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

Then, power fluctuations of generator mode are suppressed mainly by the ($\Delta P+\Delta\omega$)-PSS that is a PSS of conventional type realized by combining a $\Delta P$-PSS having stabilization function Gp(S) 13 and $\Delta\omega$-PSS having stabilization function Gw(S) 14, whereas power fluctuations of a plurality of system modes showing different frequencies are suppressed by the $\Delta\delta$-PSS that comprises a plurality of parallel-type PSSs having stabilization functions 10 that are different from each other.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Sixth Embodiment)

FIG. 16 is a block diagram of a principal portion of the sixth embodiment of multiple PSS 5' according to the invention. The components that are identical to those shown in FIG. 13 are denoted respectively by the same reference numerals and will not explained be any further. Thus, only the components different from those shown in FIG. 13 will be described below.

As illustrated in FIG. 16, the multiple PSS 5' of this embodiment uses either the signal of the frequency of power fluctuations detected from the change $\Delta\omega$ 9A in the rotational speed $\omega$ 9 of the rotor of the generator 1 or a signal equivalent to it. Then, they automatically determine the constants for controlling the stabilization functions most suited to the frequency of power fluctuations existing in the systems by computation using the predetermined algorithm.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

Then, power fluctuations of generator mode are suppressed mainly by the ($\Delta P+\Delta\omega$)-PSS that is a PSS of conventional type realized by combining a ΔP-PSS having stabilization function Gp(S) 13 and Δω-PSS having stabilization function Gw(S) 14, whereas power fluctuations of a plurality of system modes showing different frequencies are suppressed by the Δδ-PSS that comprises a plurality of parallel-type PSSs having stabilization functions 10 that are different from each other.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Seventh Embodiment)

This embodiment of multiple PSS 5' comprises only a Δδ-PSS that is a parallel-type PSS having stabilization function Gδ(S) 10 and is adapted to input the output of Δδ-PSS to said AVR 4. Instead and unlike the third embodiment, this embodiment does not comprise a (ΔP+Δω)-PSS realized by combining a ΔP-PSS that is a conventional PSS having stabilization function Gp(S) 13 and Δω-PSS that is a conventional PSS having stabilization function Gw(S) 14 as described above by referring to FIG. 9.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

In the multiple PSS 5', the change Δω 9A in the rotational speed ω 9 of the generator 1 is input to the AVR 4 by way of the stabilization function Gδ(S) 10 as output signal 5A of the multiple PSS 5'.

Power fluctuations of system mode are suppressed by the Δδ-PSS that is a parallel-type PSS having stabilization function Gδ(S) 10 and adapted to suppress such power fluctuations of system mode.

More specifically, as for the generator 1, the stabilization function Gδ(S) 10 shown in (formula 3) is selected for the parallel-type PSS of the multiple PSS 5' so as to suppress power fluctuations of system mode because only such fluctuations are problematic to the generator 1.

(Eighth Embodiment)

This embodiment of multiple PSS 5' comprises a Δδ-PSS that is a parallel-type PSS having stabilization function Gδ(S) 10, a power-fluctuation frequency detecting section 51 and a constant selecting section 53 and is adapted to input the output of Δδ-PSS to said AVR 4. Instead and unlike the second embodiment, this embodiment does not comprise a (ΔP+Δω)-PSS realized by combining a ΔP-PSS that is a conventional PSS having stabilization function Gp(S) 13 and Δω-PSS that is a conventional PSS having stabilization function Gw(S) 14 as described above by referring to FIG. 12.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS as to suppress the target power fluctuations most effectively in response to the power fluctuations existing in the system. In this way, each parallel-type PSS can suppress the power fluctuations for which the stabilization function is responsible.

(Ninth Embodiment)

This embodiment of multiple PSS 5' comprises a Δδ-PSS that is a parallel-type PSS having stabilization function Gδ(S) 10, a power-fluctuation frequency detecting section 51 and a constant computing section 54 and is adapted to input the output of Δδ-PSS to said AVR 4. Instead and unlike the third embodiment, this embodiment does not comprise a (ΔP+Δω)-PSS realized by combining a ΔP-PSS that is a conventional PSS having stabilization function Gp(S) 13 and Δω-PSS that is a conventional PSS having stabilization function Gw(S) 14 as described above by referring to FIG. 13.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS are automatically computed by the constant computing section 54 by using the formulas preselected according to the frequency as detected by the power-fluctuation frequency detecting section 1.

As the stabilization function 10 as shown in (formula 3) is so arranged for each parallel-type PSS as to suppress the target power fluctuations most effectively in response to the power fluctuations existing in the system. In this way, each parallel-type PSS can suppress the power fluctuations for which the stabilization function is responsible.

(Tenth Embodiment)

This embodiment of multiple PSS 5' comprises a plurality of (a total of N) Δδ-PSSs that are parallel-type PSSs having respective stabilization functions Gδ(S) 10A through 10N and is adapted to input the sum signal obtained by adding the output signals S3A through S3N of Δδ-PSSs by means of adder A4 to said AVR 4. Instead and unlike the fourth embodiment, this embodiment does not comprise a (ΔP+Δω)-PSS realized by combining a ΔP-PSS that is a conventional PSS having stabilization function Gp(S) 13 and Δω-PSS that is a conventional PSS having stabilization function Gw(S) 14 as described above by referring to FIG. 14.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

As the control constants of the stabilization functions 10A through 10N as shown in (formula 3) are so selected for each parallel-type PSS as to suppress the target power fluctuations most effectively in response to the power fluctuations existing in the system. In this way, each parallel-type PSS can suppress the power fluctuations for which the stabilization functions are responsible.

(Eleventh Embodiment)

This embodiment of multiple PSS 5' comprises a plurality of (more specifically a pair of) Δδ-PSSs that are parallel-type PSSs having stabilization function 10, a plurality of (more specifically a pair of) power-fluctuation frequency detecting sections 51 and a plurality of (more specifically a pair of) constant selecting sections 53 and is adapted to input the sum signal obtained by adding the output signal S3 of each of the Δδ-PSSs by means of adder A5 to said AVR 4. Instead and unlike the fifth embodiment, this embodiment does not comprise a (ΔP+Δω)-PSS realized by combining a ΔP-PSS that is a conventional PSS having stabilization function Gp(S) 13 and Δω-PSS that is a conventional PSS having stabilization function Gw(S) 14 as described above by referring to FIG. 15.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

With this embodiment, if the cycle of power fluctuations occurring during the day when the load of the system is heavy and that of power fluctuations occurring during the night when the load of the system is light differ greatly from each other and the influence of the difference is negligible or if the cycle of power fluctuations fluctuates greatly due to changes in the power interchange so that more rigorous requirements have to be selected for the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS comprising a plurality of parallel-type PSSs having respective stabilization functions 10 that are different from each other.

(Twelfth Embodiment)

This embodiment of multiple PSS 5' comprises a plurality of (more specifically a pair of) Δδ-PSSs that are parallel-type PSSs having stabilization function 10, a plurality of (more specifically a pair of) power-fluctuation frequency detecting sections 51 and a plurality of (more specifically a pair of) constant computing sections 54 and is adapted to input the sum signal obtained by adding the output signal S3 of each of the Δδ-PSSs by means of adder A6 to said AVR 4. Instead and unlike the sixth embodiment, this embodiment does not comprise a (ΔP+Δω)-PSS realized by combining a ΔP-PSS that is a conventional PSS having stabilization function Gp(S) 13 and Δω-PSS that is a conventional PSS having stabilization function Gw(S) 14 as described above by referring to FIG. 16.

Otherwise, this embodiment is same as the above described sixth embodiment and hence will not be described here any further. Therefore, this embodiment will be understood by referring to FIGS. 8 and 17.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

With this embodiment, if the cycle of power fluctuations occurring during the day when the load of the system is heavy and that of power fluctuations occurring during the night when the load of the system is light differ greatly from each other and the influence of the difference is negligible or if the cycle of power fluctuations fluctuates greatly due to changes in the power interchange so that more rigorous requirements have to be selected for the system, control constants that are more delicate than those of the third embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS comprising a plurality of parallel-type PSSs having respective stabilization functions 10 that are different from each other.

(Thirteenth Embodiment)

This embodiment of multiple PSS 5' comprises a Δδ-PSS that is a parallel-type PSS adapted to use as input a signal of the frequency of the voltage or the current of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change $-\Delta P$ of the active power 8, the change $\Delta\omega$ 9A of the rotational speed $\omega$ 9 of the generator 1 and the signal of the frequency of the voltage or the current of the generator 1 are fed to the adder A3 respectively by way of the stabilization function Gp(S) 13, the stabilization function Gw(S) 14 and the stabilization function G$\delta$(S) 10 and added by the adder A3 to obtain the output signal 5A of the multiple PSS that is output to the AVR 4 as shown in FIG. 2.

Then, power fluctuations of adjacent generator mode and those of generator mode are suppressed by the ($\Delta P+\Delta\omega$)-PSS that is a PSS of conventional type realized by combining a $\Delta P$-PSS having stabilization functions Gp(S) 13 and $\Delta\omega$-PSS having stabilization function Gw(S) 14, whereas power fluctuations of system mode are suppressed by the $\Delta\delta$-PSS that is a parallel-type PSS having stabilization function G$\delta$(S) 10 and adapted to receive the signal of the frequency of the voltage or the current of the generator 1 as input.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Fourteenth Embodiment)

This embodiment of multiple PSS 5' comprises a $\Delta\delta$-PSS that is a parallel-type PSS adapted to use as input a signal of the frequency of the voltage or the current of the generator 1 in place of the change $\Delta\omega$ 9A in the rotational speed $\omega$ 9 of the rotor of the generator 1 of the second embodiment as illustrated in FIG. 10 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed $\omega$ 9 of the rotor of the generator 1 and the control constants including the gain and the advance/delay constant of the parallel-type PSS adapted to receive as input the signal of the frequency of the voltage or the current of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the frequency of the voltage or the current of the generator 1 as to suppress the target power fluctuations most effectively in response to the power fluctuations existing in the system. In this way, each parallel-type PSS adapted to receive as input the signal of the frequency of the voltage or the current of the generator 1 can suppress the power fluctuations for which the stabilization function is responsible.

(Fifteenth Embodiment)

This embodiment of multiple PSS 5' comprises a $\Delta\delta$-PSS that is a parallel-type PSS adapted to use as input a signal of the frequency of the voltage or the current of the generator 1 in place of the change $\Delta\omega$ 9A in the rotational speed $\omega$ 9 of the rotor of the generator 1 of the third embodiment as illustrated in FIG. 11 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed $\omega$ 9 of the rotor of the generator 1 and the control constants including the gain and the advance/delay constant of the parallel-type PSS adapted to receive as input the signal of the frequency of the voltage or the current of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the frequency of the voltage or the current of the generator 1 as to suppress the target power fluctuations most effectively in response to the power fluctuations existing in the system. In this way, each parallel-type PSS adapted as input to receive the signal of the frequency of the voltage or the current of the generator 1 can suppress the power fluctuations for which the stabilization function is responsible.

(Sixteenth Embodiment)

This embodiment of multiple PSS 5' comprises as parallel-type PSS a plurality of (N) $\Delta\delta$-PSSs adapted to use as input a signal of the frequency of the voltage or the current of the generator 1 in place of the change $\Delta\omega$ 9A in the rotational speed $\omega$ 9 of the rotor of the generator 1 of the fourth embodiment as illustrated in FIG. 14 and having respective stabilization functions G$\delta$(S) 10A through 10N that include a phase advance/delay compensation function and compensate the phase delay in-phase with the phase angle signal of the rotor of the generator 1 for the input signal, said $\Delta\delta$-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal of the frequency of the voltage or the current of the generator 1 as to suppress the target power fluctuations most effectively in response to the power fluctuations existing in the system. In this way, each parallel-type PSS adapted to receive as input the signal of the frequency of the voltage or the current of the generator 1 can suppress the power fluctuations for which the stabilization function is responsible.

(Seventeenth Embodiment)

This embodiment of multiple PSS 5' comprises as parallel-type PSS a plurality of (more specifically a pair of) $\Delta\delta$-PSSs adapted to use as input a signal of the frequency of the voltage or the current of the generator 1 in place of the change $\Delta\omega$ 9A in the rotational speed $\omega$ 9 of the rotor of the generator 1 of the fifth embodiment as illustrated in FIG. 15 and having stabilization function $G\delta(S)$ 10 that includes a phase advance/delay compensation function and compensates the phase delay in-phase with the phase angle signal of the rotor of the generator 1 for the input signal, said $\Delta\delta$-PSS being also adapted to-suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the $(\Delta P+\Delta\omega)$-PSS that is a PSS of conventional type realized by combining a $\Delta P$-PSS having stabilization function $Gp(S)$ 13 and $\Delta\omega$-PSS having stabilization function $Gw(S)$ 14, whereas power fluctuations of a plurality of system modes showing much different frequencies are suppressed by the $\Delta\delta$-PSS that comprises a plurality of parallel-type PSSs having stabilization function $G\delta(S)$ 10 and receives as input the signal of the frequency of the voltage or the current of the generator 1.

The control constants of the stabilization function 10 as shown in (formula 3) are so selected for each parallel-type PSS adapted to receive as input the signal of the frequency of the voltage or the current of the generator 1 as to suppress the target power fluctuations most effectively in response to the power fluctuations existing in the system. In this way, each parallel-type PSS adapted to receive as input the signal of the frequency of the voltage or the current of the generator 1 can suppress the power fluctuations for which the stabilization function is responsible.

(Eighteenth Embodiment)

This embodiment of multiple PSS 5' comprises as parallel-type PSS a plurality of (more specifically a pair of) $\Delta\delta$-PSSs adapted to use as input a signal of the frequency of the voltage or the current of the generator 1 in place of the change $\Delta\omega$ 9A in the rotational speed $\omega$ 9 of the rotor of the generator 1 of the sixth embodiment as illustrated in FIG. 16 and having stabilization function $G\delta(S)$ 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the $(\Delta P+\Delta\omega)$-PSS that is a PSS of conventional type realized by combining a $\Delta P$-PSS having stabilization function $Gp(S)$ 13 and $\Delta\omega$-PSS having stabilization function $Gw(S)$ 14, whereas power fluctuations of a plurality of system modes showing much different frequencies are suppressed by the $\Delta\delta$-PSS that comprises a plurality of parallel-type PSSs having stabilization function $G\delta(S)$ 10 and receives as input the signal of the frequency of the voltage or the current of the generator 1.

The control constants of the stabilization function 10 as shown in (formula 3) are so selected for each parallel-type PSS adapted to receive as input the signal of the frequency of the voltage or the current of the generator 1 as to suppress the target power fluctuations most effectively in response to the power fluctuations existing in the system. In this way, each parallel-type PSS adapted to receive as input the signal of the frequency of the voltage or the current of the generator 1 can suppress the power fluctuations for which the stabilization function is responsible.

(Nineteenth Embodiment)

This embodiment of multiple PSS 5' comprises a $\Delta\delta$-PSS that is a parallel-type PSS adapted to use as input a signal of the frequency of the voltage or the current of the generator 1 in place of the change $\Delta\omega$ 9A in the rotational speed $\omega$ 9 of the rotor of the generator 1 of the seventh embodiment and having stabilization function $G\delta(S)$ 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal of the frequency of the voltage or the current of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal of the frequency of the voltage or the current of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal of the frequency of the voltage or the current of the generator 1 so as to suppress power fluctuations of system mode because only such fluctuations are problematic to the generator 1.

(Twentieth Embodiment)

This embodiment of multiple PSS 5' comprises a Δδ-PSS that is a parallel-type PSS adapted to use as input a signal of the frequency of the voltage or the current of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 51' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the frequency of the voltage or the current of the generator 1 are automatically selected by the constant selecting section 53 out of a number of constants stored in advance by taking various system conditions into consideration according to the frequency detected by the power-fluctuation frequency detecting section 51.

(Twenty-first Embodiment)

This embodiment of multiple PSS 5' comprises a Δδ-PSS that is a parallel-type PSS adapted to use as input a signal of the frequency of the voltage or the current of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the frequency of the voltage or the current of the generator 1 are automatically computed by the constant computing section 54 by using the formulas selected in advance according to the frequency as detected by the power-fluctuation frequency detecting section 51.

(Twenty-second Embodiment)

This embodiment of multiple PSS 5' comprises as parallel-type PSS a plurality of (N) Δδ-PSSs adapted to use as input a signal of the frequency of the voltage or the current of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal of the frequency of the voltage or the current of the generator 1 as to suppress the target power fluctuations most effectively in response to the power fluctuations existing in the system. In this way, each parallel-type PSS adapted to receive as input the signal of the frequency of the voltage or the current of the generator 1 can suppress the power fluctuations for which the stabilization function is responsible.

(Twenty-third Embodiment)

This embodiment of multiple PSS 5' comprises as parallel-type PSS a plurality of (more specifically a pair of) Δδ-PSSs adapted to use as input a signal of the frequency of the voltage or the current of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the frequency of the voltage or the current of the generator 1 and comprising a plurality of parallel-type PSSs having respective stabilization functions 10 that are different from each other.

(Twenty-fourth Embodiment)

This embodiment of multiple PSS 5' comprises as parallel-type PSS a plurality of (more specifically a pair of) Δδ-PSSs adapted to use as input a signal of the frequency of the voltage or the current of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the frequency of the voltage or the current of the generator 1 and comprising a plurality of parallel-type PSSs having respective stabilization functions 10 that are different from each other.

(Twenty-fifth Embodiment)

This embodiment of multiple PSS 5' comprises a Δδ-PSS that is a parallel-type PSS adapted to use as input a signal of the active power P8 of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal of the active power P8 of the generator 1 are fed to the adder A3 respectively by way of the stabilization function Gp(S) 13, the stabilization function Gw(S) 14 and the stabilization function 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δω-PSS having stabilization function Gw(S) 14, whereas power fluctuations of system mode are suppressed by the Δδ-PSS that is a parallel-type PSS having stabilization function Gδ(S) 10 and adapted to receive as input the signal of the active power P8 of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Twenty-sixth Embodiment)

This embodiment of multiple PSS 5' comprises a Δδ-PSS that is a parallel-type PSS adapted to use as input a signal of the active power P8 of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the active power P8 of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the active power P8 of the generator 1 as to suppress the target power fluctuations most effectively in response to the power fluctuations existing in the system. In this way, each parallel-type PSS adapted to receive as input the signal of the active power P8 of the generator 1 can suppress the power fluctuations for which the stabilization function is responsible.

(Twenty-seventh Embodiment)

This embodiment of multiple PSS 5' comprises a Δδ-PSS that is a parallel-type PSS adapted to use as input a signal of the active power P8 of the generator 1 in place of the change Δω 9A in the rotational speed ω 9 of the rotor of the generator 1 of the third embodiment as illustrated in FIG. 11 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the active power P8 of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the active power P8 of the generator 1 as to suppress the target power fluctuations most effectively in response to the power fluctuations existing in the system. In this way, each parallel-type PSS adapted as input to receive the signal of the active power P8 of the generator 1 can suppress the power fluctuations for which the stabilization function is responsible.

(Twenty-eighth Embodiment)

This embodiment of multiple PSS 5' comprises as parallel-type PSS a plurality of (N) Δδ-PSSs adapted to use as input a signal of the active power P8 of the generator 1 in place of the change Δω 9A in the rotational speed ω 9 of the rotor of the generator 1 of the fourth embodiment as illustrated in FIG. 14 and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal of the active power P8 of the generator 1 as to suppress the target power fluctuations most effectively in response to the power fluctuations existing in the system. In this way, each parallel-type PSS adapted to receive as input the signal of the active power P8 of the generator 1 can suppress the power fluctuations for which the stabilization function is responsible.

(Twenty-ninth Embodiment)

This embodiment of multiple PSS 5' comprises as parallel-type PSS a plurality of (more specifically a pair of) Δδ-PSSs adapted to use as input a signal of the active power P8 of the generator 1 in place of the change Δω 9A in the rotational speed ω 9 of the rotor of the generator 1 of the fifth embodiment as illustrated in FIG. 15 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the ($\Delta P+\Delta \omega$)-PSS that is a PSS of conventional type realized by combining a $\Delta P$-PSS having stabilization function Gp(S) 13 and $\Delta \omega$-PSS having stabilization function Gw(S) 14, whereas power fluctuations of a plurality of system modes showing much different frequencies are suppressed by the $\Delta \delta$-PSS that comprises a plurality of parallel-type PSSs having stabilization function G$\delta$(S) 10 and receives as input the signal of the active power P8 of the generator 1.

The control constants of the stabilization function 10 as shown in (formula 3) are so selected for each parallel-type PSS adapted to receive as input the signal of the active power P8 of the generator 1 as to suppress the target power fluctuations most effectively in response to the power fluctuations existing in the system. In this way, each parallel-type PSS adapted to receive as input the signal of the active power P8 of the generator 1 can suppress the power fluctuations for which the stabilization function is responsible.

(Thirtieth Embodiment)

This embodiment of multiple PSS 5' comprises as parallel-type PSS a plurality of (more specifically a pair of) $\Delta \delta$-PSSs adapted to use as input a signal of the active power P8 of the generator 1 in place of the change $\Delta \omega$ 9A in the rotational speed $\omega$ 9 of the rotor of the generator 1 of the sixth embodiment as illustrated in FIG. 16 and having stabilization function G$\delta$(S) 10 that includes a phase advance/delay compensation function and compensates the phase delay in-phase with the phase angle signal of the rotor of the generator 1 for the input signal, said $\Delta \delta$-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the ($\Delta P+\Delta \omega$)-PSS that is a PSS of conventional type realized by combining a $\Delta P$-PSS having stabilization function Gp(S) 13 and $\Delta \omega$-PSS having stabilization function Gw(S) 14, whereas power fluctuations of a plurality of system modes showing much different frequencies are suppressed by the $\Delta \delta$-PSS that comprises a plurality of parallel-type PSSs having stabilization function G$\delta$(S) 10 and receives as input the signal of the active power P8 of the generator 1.

The control constants of the stabilization function 10 as shown in (formula 3) are so selected for each parallel-type PSS adapted to receive as input the signal of the active power P8 of the generator 1 as to suppress the target power fluctuations most effectively in response to the power fluctuations existing in the system. In this way, each parallel-type PSS adapted to receive as input the signal of the active power P8 of the generator 1 can suppress the power fluctuations for which the stabilization function is responsible.

(Thirty-first Embodiment)

This embodiment of multiple PSS 5' comprises a $\Delta \delta$-PSS that is a parallel-type PSS adapted to use as input a signal of the active power P8 of the generator 1 in place of the change $\Delta \omega$ 9A in the rotational speed $\omega$ 9 of the rotor of the generator 1 of the seventh embodiment and having stabilization function G$\delta$(S) 10 that includes a phase advance/delay compensation function and compensates the phase delay in-phase with the phase angle signal of the rotor of the generator 1 for the input signal, said $\Delta \delta$-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal of the active power P8 of the generator 1 is input to the AVR 4 as output signal 5A of the multiple PSS by way of the stabilization function Gp(S) 10.

Then, power fluctuations of system mode are suppressed by the $\Delta P$-PSS that is a parallel-type PSS adapted to use as input a signal of the active power P8 of the generator 1 and having stabilization function G$\delta$(S) 10 selected so as to be adaptable to such power-fluctuations.

More specifically, as for the generator 1, the stabilization function G$\delta$(S) 10 shown in (formula 3) is selected for the parallel-type PSS of the multiple PSS 5' adapted to use as input the signal of the active power P8 of the generator 1 so as to suppress power fluctuations of system mode because only such fluctuations are problematic to the generator 1.

(Thirty-second Embodiment)

This embodiment of multiple PSS 5' comprises a $\Delta \delta$-PSS that is a parallel-type PSS adapted to use as input a signal of the active power P8 of the generator 1 in place of the change $\Delta \omega$ 9A in the rotational speed $\omega$ 9 of the rotor of the generator 1 of the eighth embodiment and having stabilization function G$\delta$(S) 10 that includes a phase advance/delay compensation function and compensates the phase delay in-phase with the phase angle signal of the rotor of the generator 1 for the input signal, said $\Delta \delta$-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the active power P8 of the generator 1 are automatically selected by the constant selecting section 53 out of a number of constants stored in advance by taking various system conditions into consideration according to the frequency detected by the power-fluctuation frequency detecting section 51.

(Thirty-third Embodiment)

This embodiment of multiple PSS 5' comprises a Δδ-PSS that is a parallel-type PSS adapted to use as input a signal of the active power P8 of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the active power P8 of the generator 1 are automatically computed by the constant computing section 54 by using the formulas selected in advance according to the frequency as detected by the power-fluctuation frequency detecting section 51.

(Thirty-fourth Embodiment)

This embodiment of multiple PSS 5' comprises as parallel-type PSS a plurality of (N) Δδ-PSSs adapted to use as input a signal of the active power P8 of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal of the active power P8 of the generator 1 as to suppress the target power fluctuations most effectively in response to the power fluctuations existing in the system. In this way, each parallel-type PSS adapted to receive as input the signal of the active power P8 of the generator 1 can suppress the power fluctuations for which the stabilization function is responsible.

(Thirty-fifth Embodiment)

This embodiment of multiple PSS 5' comprises as parallel-type PSS a plurality of (more specifically a pair of) Δδ-PSSs adapted to use as input a signal of the active power P8 of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the active power P8 of the generator 1 and comprising a plurality of parallel-type PSSs having respective stabilization functions 10 that are different from each other.

(Thirty-sixth Embodiment)

This embodiment of multiple PSS 5' comprises as parallel-type PSS a plurality of (more specifically a pair of) Δδ-PSSs adapted to use as input a signal of the active power P8 of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the active power P8 of the generator 1 and comprising a plurality of parallel-type PSSs having respective stabilization functions 10 that are different from each other.

(Thirty-seventh Embodiment)

This embodiment of multiple PSS 5' comprises a Δδ-PSS that is a parallel-type PSS adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal equivalent to the rotational acceleration generated by combining the signal of the guide vane opening of the water wheel and that of the active power P8 of the generator 1 are fed to the adder A3 respectively by way of the stabilization function Gp(S) 13, the stabilization function Gw(S) 14 and the stabilization function Gδ(S) 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δω-PSS having stabilization function Gw(S) 14, whereas power fluctuations of system mode are suppressed by the Δδ-PSS that is a parallel-type PSS having stabilization function Gδ(S) 10 and adapted to receive as input the signal equivalent to the rotational acceleration generated by combining the signal of the guide vane opening of the water wheel and that of the active power P8 of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Thirty-eighth Embodiment)

This embodiment of multiple PSS 5' comprises a Δδ-PSS that is a parallel-type PSS adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the rotational acceleration generated by combining the signal of the guide vane opening of the water wheel and that of the active power P8 of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal equivalent to the rotational acceleration generated by combining the signal of the guide vane opening of the water wheel and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the guide vane opening of the water wheel and that of the active power P8 of the generator 1 can suppress the power fluctuations for which the stabilization function is responsible.

(Thirty-ninth Embodiment)

This embodiment of multiple PSS 5' comprises a $\Delta\delta$-PSS that is a parallel-type PSS adapted to use as input a signal equivalent to the rotational acceleration generated by combining the signal of the guide vane opening of the water wheel and that of the active power P8 of the generator 1 in place of the change $\Delta\omega$ 9A in the rotational speed $\omega$ 9 of the rotor of the generator 1 of the third embodiment as illustrated in FIG. 11 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed $\omega$ 9 of the rotor of the generator 1 and the control constants including the gain and the advance/delay constant of the parallel-type PSS adapted to receive as input the signal equivalent to the rotational acceleration generated by combining the signal of the guide vane opening of the water wheel and that of the active power P8 of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal equivalent to the rotational acceleration generated by combining the signal of the guide vane opening of the water wheel and that of the active power P8 of the generator 1 as to suppress the target power fluctuations most effectively in response to the power fluctuations existing in the system. In this way, each parallel-type PSS adapted as input to receive the signal equivalent to the rotational acceleration generated by combining the signal of the guide vane opening of the water wheel and that of the active power P8 of the generator 1 can suppress the power fluctuations for which the stabilization function is responsible.

(Fortieth Embodiment)

This embodiment of multiple PSS 5' comprises as parallel-type PSS a plurality of (N) $\Delta\delta$-PSSs adapted to use as input a signal equivalent to the rotational acceleration generated by combining the signal of the guide vane opening of the water wheel and that of the active power P8 of the generator 1 in place of the change $\Delta\omega$ 9A in the rotational speed $\omega$ 9 of the rotor of the generator 1 of the fourth embodiment as illustrated in FIG. 14 and having respective stabilization functions G$\delta$(S) 10A through 10N that include a phase advance/delay compensation function and compensate the phase delay in-phase with the phase angle signal of the rotor of the generator 1 for the input signal, said $\Delta\delta$-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal equivalent to the rotational acceleration generated by combining the signal of the guide vane opening of the water wheel and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the guide vane opening of the water wheel and that of the active power P8 of the generator 1 can suppress the power fluctuations for which the stabilization function is responsible.

(Forty-first Embodiment)

This embodiment of multiple PSS 5' comprises as parallel-type PSS a plurality of (more specifically a pair of) $\Delta\delta$-PSSs adapted to use as input a signal equivalent to the rotational acceleration generated by combining the signal of the guide vane opening of the water wheel and that of the active power P8 of the generator 1 in place of the change $\Delta\omega$ 9A in the rotational speed $\omega$ 9 of the rotor of the generator 1 of the fifth embodiment as illustrated in FIG. 15 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the ($\Delta P+\Delta\omega$)-PSS that is a PSS of conventional type realized by combining a $\Delta P$-PSS having stabilization function Gp(S) 13 and $\Delta\omega$-PSS having stabilization function Gw(S) 14, whereas power fluctuations of a plurality of system modes showing much different frequencies are suppressed by the $\Delta\delta$-PSS that comprises a plurality of parallel-type PSSs having stabilization function G$\delta$(S) 10 and receives as input the signal equivalent to the rotational acceleration generated by combining the signal of the guide vane opening of the water wheel and that of the active power P8 of the generator 1.

The control constants of the stabilization function 10 as shown in (formula 3) are so selected for each parallel-type PSS adapted to receive as input the signal equivalent to the rotational acceleration generated by combining the signal of the guide vane opening of the water wheel and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the guide vane opening of the water wheel and that of the active power P8 of the generator 1 can suppress the power fluctuations for which the stabilization function is responsible.

(Forty-second Embodiment)

This embodiment of multiple PSS 5' comprises as parallel-type PSS a plurality of (more specifically a pair of) Δδ-PSSs adapted to use as input a signal equivalent to the rotational acceleration generated by combining the signal of the guide vane opening of the water wheel and that of the active power P8 of the generator 1 in place of the change Δ107 9A in the rotational speed ω 9 of the rotor of the generator 1 of the sixth embodiment as illustrated in FIG. 16 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δω-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal equivalent to the rotational acceleration generated by combining the signal of the guide vane opening of the water wheel and that of the active power P8 of the generator 1.

The control constants of the stabilization function 10 as shown in (formula 3) are so selected for each parallel-type PSS adapted to receive as input the signal equivalent to the rotational acceleration generated by combining the signal of the guide vane opening of the water wheel and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the guide vane opening of the water wheel and that of the active power P8 of the generator 1 can suppress the power fluctuations for which the stabilization function is responsible.

(Forty-third Embodiment)

This embodiment of multiple PSS 5' comprises a Δδ-PSS that is a parallel-type PSS adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the seventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal equivalent to the rotational acceleration generated by combining the signal of the guide vane opening of the water wheel and that of the active power P8 of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal equivalent to the rotational acceleration generated by combining the signal of the guide vane opening of the water wheel and that of the active power P8 of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal equivalent to the rotational acceleration generated by combining the signal of the guide vane opening of the water wheel and that of the active power P8 of the generator 1 so as to suppress power fluctuations of system mode because only such fluctuations are problematic to the generator 1.

(Forty-fourth Embodiment)

This embodiment of multiple PSS 5' comprises a Δδ-PSS that is a parallel-type PSS adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the rotational acceleration generated by combining the signal of the guide vane opening of the water wheel and that of the active power P8 of the generator 1 are automatically selected by the constant selecting section 53 out of a number of constants stored in advance by taking various system conditions into consideration according to the frequency detected by the power-fluctuation frequency detecting section 51.

(Forty-fifth Embodiment)

This embodiment of multiple PSS 5' comprises a Δδ-PSS that is a parallel-type PSS adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the rotational acceleration generated by combining the signal of the guide vane opening of the water wheel and that of the active power P8 of the generator 1 are automatically computed by the constant computing section 54 by using the formulas selected in advance according to the frequency as detected by the power-fluctuation frequency detecting section 51.

(Forty-sixth Embodiment)

This embodiment of multiple PSS 5' comprises as parallel-type PSS a plurality of (N) Δδ-PSSs adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal equivalent to the rotational acceleration generated by combining the signal of the guide vane opening of the water wheel and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the guide vane opening of the water wheel and that of the active power P8 of the generator 1 can suppress the power fluctuations for which the stabilization function is responsible.

(Forty-seventh Embodiment)

This embodiment of multiple PSS 5' comprises as parallel-type PSS a plurality of (more specifically a pair of) Δδ-PSSs adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal equivalent to the rotational acceleration generated by combining the signal of the guide vane opening of the water wheel and that of the active power P8 of the generator 1 and comprising a plurality of parallel-type PSSs having respective stabilization functions 10 that are different from each other.

(Forty-eighth Embodiment)

This embodiment of multiple PSS 5' comprises as parallel-type PSS a plurality of (more specifically a pair of) Δδ-PSSs adapted to use as input a signal equivalent to the rotational acceleration generated by combining the signal of the guide vane opening of the water wheel and that of the active power P8 of the generator 1 in place of the change Δω 9A in the rotational speed ω 9 of the rotor of the generator 1 of the twelfth embodiment and having stabilization function G5 (S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSS. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal equivalent to the rotational acceleration generated by combining the signal of the guide vane opening of the water wheel and that of the active power P8 of the generator 1 and comprising a plurality of parallel-type PSSs having respective stabilization functions 10 that are different from each other.

(Forty-ninth Embodiment)

This embodiment of multiple PSS 5' comprises a Δδ-PSS that is a parallel-type PSS adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal equivalent to the rotational acceleration generated by combining the signal of the valve opening of the turbine directly linked to the generator 1 and that of the active power P8 of the generator 1 are fed to the adder A3 respectively by way of the stabilization function Gp(S) 13, the stabilization function Gw(S) 14 and the stabilization function Gδ(S) 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δω-PSS having stabilization function Gw(S) 14, whereas power fluctuations of system mode are suppressed by the Δδ-PSS that is a parallel-type PSS having stabilization function Gδ(S) 10 and adapted to receive as input the signal equivalent to the rotational acceleration generated by combining the signal of the valve opening of the turbine directly linked to the generator 1 and that of the active power P8 of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Fiftieth Embodiment)

This embodiment of multiple PSS 5' comprises a Δδ-PSS that is a parallel-type PSS adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the rotational acceleration generated by combining the signal of the valve opening of the turbine directly linked to the generator 1 and that of the active power P8 of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal equivalent to the rotational acceleration generated by combining the signal of the valve opening of the turbine directly linked to the generator 1 and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the valve opening of the turbine directly linked to the generator 1 and that of the active power P8 of the generator 1 can suppress the power fluctuations for which the stabilization function is responsible.

(Fifty-first Embodiment)

This embodiment of multiple PSS 5' comprises a Δδ-PSS that is a parallel-type PSS adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the third embodiment as illustrated in FIG. 11 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the rotational acceleration generated by combining the signal of the valve opening of the turbine directly linked to the generator 1 and that of the active power P8 of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal equivalent to the rotational acceleration generated by combining the signal of the valve opening of the turbine directly linked to the generator 1 and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the valve opening of the turbine directly linked to the generator 1 and that of the active power P8 of the generator 1 can suppress the power fluctuations for which the stabilization function is responsible.

(Fifty-second Embodiment)

This embodiment of multiple PSS 5' comprises as parallel-type PSS a plurality of (N) Δδ-PSSs adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the fourth embodiment as illustrated in FIG. 14 and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal equivalent to the rotational acceleration generated by combining the signal of the valve opening of the turbine directly linked to the generator 1 and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the valve opening of the turbine directly linked to the generator 1 and that of the active power P8 of the generator 1 can suppress the power fluctuations for which the stabilization function is responsible.

(Fifty-third Embodiment)

This embodiment of multiple PSS 5' comprises as parallel-type PSS a plurality of (more specifically a pair of) $\Delta\delta$-PSSs adapted to use as input a signal equivalent to the rotational acceleration generated by combining the signal of the valve opening of the turbine directly linked to the generator 1 and that of the active power P8 of the generator 1 in place of the change $\Delta\omega$ 9A in the rotational speed $\omega$ 9 of the rotor of the generator 1 of the fifth embodiment as illustrated in FIG. 15 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the ($\Delta$P+$\Delta\omega$)-PSS that is a PSS of conventional type realized by combining a $\Delta$P-PSS having stabilization function Gp(S) 13 and $\Delta\omega$-PSS having stabilization function Gw(S) 14, whereas power fluctuations of a plurality of system modes showing much different frequencies are suppressed by the $\Delta\delta$-PSS that comprises a plurality of parallel-type PSSs having stabilization function G$\delta$(S) 10 and receives as input the signal equivalent to the rotational acceleration generated by combining the signal of the valve opening of the turbine directly linked to the generator 1 and that of the active power P8 of the generator 1.

The control constants of the stabilization function 10 as shown in (formula 3) are so selected for each parallel-type PSS adapted to receive as input the signal equivalent to the rotational acceleration generated by combining the signal of the valve opening of the turbine directly linked to the generator 1 and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the valve opening of the turbine directly linked to the generator 1 and that of the active power P8 of the generator 1 can suppress the power fluctuations for which the stabilization function is responsible.

(Fifty-fourth Embodiment)

This embodiment of multiple PSS 5' comprises as parallel-type PSS a plurality of (more specifically a pair of) $\Delta\delta$-PSSs adapted to use as input a signal equivalent to the rotational acceleration generated by combining the signal of the valve opening of the turbine directly linked to the generator 1 and that of the active power P8 of the generator 1 in place of the change $\Delta\omega$ 9A in the rotational speed $\omega$ 9 of the rotor of the generator 1 of the sixth embodiment as illustrated in FIG. 16 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the ($\Delta$P+$\Delta\omega$)-PSS that is a PSS of conventional type realized by combining a $\Delta$P-PSS having stabilization function Gp(S) 13 and $\Delta\omega$-PSS having stabilization function Gw(S) 14, whereas power fluctuations of a plurality of system modes showing much different frequencies are suppressed by the $\Delta\delta$-PSS that comprises a plurality of parallel-type PSSs having stabilization function G$\delta$(S) 10 and receives as input the signal equivalent to the rotational acceleration generated by combining the signal of the valve opening of the turbine directly linked to the generator 1 and that of the active power P8 of the generator 1.

The control constants of the stabilization function 10 as shown in (formula 3) are so selected for each parallel-type PSS adapted to receive as input the signal equivalent to the rotational acceleration generated by combining the signal of the valve opening of the turbine directly linked to the generator 1 and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the valve opening of the turbine directly linked to the generator 1 and that of the active power P8 of the generator 1 can suppress the power fluctuations for which the stabilization function is responsible.

(Fifty-fifth Embodiment)

This embodiment of multiple PSS 5' comprises a $\Delta\delta$-PSS that is a parallel-type PSS adapted to use as input a signal equivalent to the rotational acceleration generated by combining the signal of the valve opening of the turbine directly linked to the generator 1 and that of the active power P8 of the generator 1 in place of the change $\Delta\omega$ 9A in the rotational speed $\omega$ 9 of the rotor of the generator 1 of the seventh embodiment and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal equivalent to the rotational acceleration generated by combining the signal of the valve opening of the turbine directly linked to the generator 1 and that of the active power P8 of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal equivalent to the rotational acceleration generated by combining the signal of the valve opening of the turbine directly linked to the generator 1 and that of the active power P8 of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal equivalent to the rotational acceleration generated by combining the signal of the valve opening of the turbine directly linked to the generator 1 and that of the active power P8 of the generator 1 so as to suppress power fluctuations of system mode because only such fluctuations are problematic to the generator 1.

(Fifty-sixth Embodiment)

This embodiment of multiple PSS 5' comprises a Δδ-PSS that is a parallel-type PSS adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the rotational acceleration generated by combining the signal of the valve opening of the turbine directly linked to the generator 1 and that of the active power P8 of the generator 1 are automatically selected by the constant selecting section 53 out of a number of constants stored in advance by taking various system conditions into consideration according to the frequency detected by the power-fluctuation frequency detecting section 51.

(Fifty-seventh Embodiment)

This embodiment of multiple PSS 5' comprises a Δδ-PSS that is a parallel-type PSS adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the rotational acceleration generated by combining the signal of the valve opening of the turbine directly linked to the generator 1 and that of the active power P8 of the generator 1 are automatically computed by the constant computing section 54 by using the formulas selected in advance according to the frequency as detected by the power-fluctuation frequency detecting section 51.

(Fifty-eighth Embodiment)

This embodiment of multiple PSS 5' comprises as parallel-type PSS a plurality of (N) Δδ-PSSs adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal equivalent to the rotational acceleration generated by combining the signal of the valve opening of the turbine directly linked to the generator 1 and that of the active power P8 of the generator 1 as to suppress the target power fluctuations most effectively in response to the power fluctuations existing in the system. In this way, each parallel-type PSS adapted to receive as input the signal equivalent to the rotational acceleration generated by combining the signal of the valve opening of the turbine directly linked to the generator 1 and that of the active power P8 of the generator 1 can suppress the power fluctuations for which the stabilization function is responsible.

(Fifty-ninth Embodiment)

This embodiment of multiple PSS 5' comprises as parallel-type PSS a plurality of (more specifically a pair of) Δδ-PSSs adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal equivalent to the rotational acceleration generated by combining the signal of the valve opening of the turbine directly linked to the generator 1 and that of the active power P8 of the generator 1 and comprising a plurality of parallel-type PSSs having respective stabilization functions 10 that are different from each other.

(Sixtieth Embodiment)

This embodiment of multiple PSS 5' comprises as parallel-type PSS a plurality of (more specifically a pair of) Δδ-PSSs adapted to use as input a signal equivalent to the rotational acceleration generated by combining the signal of the valve opening of the turbine directly linked to the generator 1 and that of the active power P8 of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSS. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal equivalent to the rotational acceleration generated by combining the signal of the valve opening of the turbine directly linked to the generator 1 and that of the active power P8 of the generator 1 and comprising a plurality of parallel-type PSSs having respective stabilization functions 10 that are different from each other.

(Sixty-first Embodiment)

This embodiment of multiple PSS 5' comprises a Δδ-PSS that is a parallel-type PSS adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal equivalent to the phase angle of the rotor of the generator 1 generated by combining the signal of the active power P8 of the generator 1 and that of voltage Vg3A of the generator 1 are fed to the adder A3 respectively by way of the stabilization function Gp(S) 13, the stabilization function Gw(S) 14 and the stabilization function Gδ(S) 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δω-PSS having stabilization function Gw(S) 14, whereas power fluctuations of system mode are suppressed by the Δδ-PSS that is a parallel-type PSS having stabilization function Gδ(S) 10 and adapted to receive as input the signal equivalent to the phase angle of the rotor of the generator 1 generated by combining the signal of the active power P8 of the generator 1 and that of voltage Vg3A of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Sixty-second Embodiment)

This embodiment of multiple PSS 5' comprises a Δδ-PSS that is a parallel-type PSS adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the phase angle of the rotor of the generator 1 generated by combining the signal of the active power P8 of the generator 1 and that of voltage Vg3A of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal equivalent to the phase angle of the rotor of the generator 1 generated by combining the signal of the active power P8 of the generator 1 and that of voltage Vg3A of the generator 1 as to suppress the target power fluctuations most effectively in response to the power fluctuations existing in the system. In this way, each parallel-type PSS adapted to receive as input the signal equivalent to the phase angle of the rotor of the generator 1 generated by combining the signal of the active power P8 of the generator 1 and that of voltage Vg3A of the generator 1 can suppress the power fluctuations for which the stabilization function is responsible.

(Sixty-third Embodiment)

This embodiment of multiple PSS 5' comprises a Δδ-PSS that is a parallel-type PSS adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the third embodiment as illustrated in FIG. 11 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the phase angle of the rotor of the generator 1 generated by combining the signal of the active power P8 of the generator 1 and that of voltage Vg3A of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal equivalent to the phase angle of the rotor of the generator 1 generated by combining the signal of the active power P8 of the generator 1 and that of voltage Vg3A of the generator 1 as to suppress the target power fluctuations most effectively in response to the power fluctuations existing in the system. In this way, each parallel-type PSS adapted as input to receive the signal equivalent to the phase angle of the rotor of the generator 1 generated by combining the signal of the active power P8 of the generator 1 and that of voltage Vg3A of the generator 1 can suppress the power fluctuations for which the stabilization function is responsible.

(Sixty-fourth Embodiment)

This embodiment of multiple PSS 5' comprises as parallel-type PSS a plurality of (N) Δδ-PSSs adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the fourth embodiment as illustrated in FIG. 14 and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal equivalent to the phase angle of the rotor of the generator 1 generated by combining the signal of the active power P8 of the generator 1 and that of voltage Vg3A of the generator 1 as to suppress the target power fluctuations most effectively in response to the power fluctuations existing in the system. In this way, each parallel-type PSS adapted to receive as input the signal equivalent to the phase angle of the rotor of the generator 1 generated by combining the signal of the active power P8 of the generator 1 and that of voltage Vg3A of the generator 1 can suppress the power fluctuations for which the stabilization function is responsible.

(Sixty-fifth Embodiment)

This embodiment of multiple PSS 5' comprises as parallel-type PSS a plurality of (more specifically a pair of) Δδ-PSSs adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the fifth embodiment as illustrated in FIG. 15 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δδ-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal equivalent to the phase angle of the rotor of the generator 1 generated by combining the signal of the active power P8 of the generator 1 and that of voltage Vg3A of the generator 1.

The control constants of the stabilization function 10 as shown in (formula 3) are so selected for each parallel-type PSS adapted to receive as input the signal equivalent to the phase angle of the rotor of the generator 1 generated by combining the signal of the active power P8 of the generator 1 and that of voltage Vg3A of the generator 1 as to suppress the target power fluctuations most effectively in response to the power fluctuations existing in the system. In this way, each parallel-type PSS adapted to receive as input the signal equivalent to the phase angle of the rotor of the generator 1 generated by combining the signal of the active power P8 of the generator 1 and that of voltage Vg3A of the generator 1 can suppress the power fluctuations for which the stabilization function is responsible.

(Sixty-sixth Embodiment)

This embodiment of multiple PSS 5' comprises as parallel-type PSS a plurality of (more specifically a pair of) Δδ-PSSs adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the sixth embodiment as illustrated in FIG. 16 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δω-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal equivalent to the phase angle of the rotor of the generator 1 generated by combining the signal of the active power P8 of the generator 1 and that of voltage Vg3A of the generator 1.

The control constants of the stabilization function 10 as shown in (formula 3) are so selected for each parallel-type PSS adapted to receive as input the signal equivalent to the phase angle of the rotor of the generator 1 generated by combining the signal of the active power P8 of the generator 1 and that of voltage Vg3A of the generator 1 as to suppress the target power fluctuations most effectively in response to the power fluctuations existing in the system. In this way, each parallel-type PSS adapted to receive as input the signal equivalent to the phase angle of the rotor of the generator 1 generated by combining the signal of the active power P8 of the generator 1 and that of voltage Vg3A of the generator 1 can suppress the power fluctuations for which the stabilization function is responsible.

(Sixty-seventh Embodiment)

This embodiment of multiple PSS 5' comprises a Δδ-PSS that is a parallel-type PSS adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the seventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal equivalent to the phase angle of the rotor of the generator 1 generated by combining the signal of the active power P8 of the generator 1 and that of voltage Vg3A of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal equivalent to the phase angle of the rotor of the generator 1 generated by combining the signal of the active power P8 of the generator 1 and that of voltage Vg3A of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal equivalent to the phase angle of the rotor of the generator 1 generated by combining the signal of the active power P8 of the generator 1 and that of voltage Vg3A of the generator 1 so as to suppress power fluctuations of system mode because only such fluctuations are problematic to the generator 1.

(Sixty-eighth Embodiment)

This embodiment of multiple PSS 5' comprises a Δδ-PSS that is a parallel-type PSS adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the phase angle of the rotor of the generator 1 generated by combining the signal of the active power P8 of the generator 1 and that of voltage Vg3A of the generator 1 are automatically selected by the constant selecting section 53 out of a number of constants stored in advance by taking various system conditions into consideration according to the frequency detected by the power-fluctuation frequency detecting section 51.

(Sixty-ninth Embodiment)

This embodiment of multiple PSS 5' comprises a Δδ-PSS that is a parallel-type PSS adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal equivalent to the phase angle of the rotor of the generator 1 generated by combining the signal of the active power P8 of the generator 1 and that of voltage Vg3A of the generator 1 are automatically computed by the constant computing section 54 by using the formulas selected in advance according to the frequency as detected by the power-fluctuation frequency detecting section 51.

(Seventies Embodiment)

This embodiment of multiple PSS 5' comprises as parallel-type PSS a plurality of (N) Δδ-PSSs adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal equivalent to the phase angle of the rotor of the generator 1 generated by combining the signal of the active power P8 of the generator 1 and that of voltage Vg3A of the generator 1 as to suppress the target power fluctuations most effectively in response to the power fluctuations existing in the system. In this way, each parallel-type PSS adapted to receive as input the signal equivalent to the phase angle of the rotor of the generator 1 generated by combining the signal of the active power P8 of the generator 1 and that of voltage Vg3A of the generator 1 can suppress the power fluctuations for which the stabilization function is responsible.

(Seventy-first Embodiment)

This embodiment of multiple PSS 5' comprises as parallel-type PSS a plurality of (more specifically a pair of) Δδ-PSSs adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal equivalent to the phase angle of the rotor of the generator 1 generated by combining the signal of the active power P8 of the generator 1 and that of voltage Vg3A of the generator 1 and comprising a plurality of parallel-type PSSs having respective stabilization functions 10 that are different from each other.

(Seventy-second Embodiment)

This embodiment of multiple PSS 5' comprises as parallel-type PSS a plurality of (more specifically a pair of) Δδ-PSSs adapted to use as input a signal equivalent to the phase angle of the rotor of the generator 1 generated by combining the signal of the active power P8 of the generator 1 and that of voltage Vg3A of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal equivalent to the phase angle of the rotor of the generator 1 generated by combining the signal of the active power P8 of the generator 1 and that of voltage Vg3A of the generator 1 and comprising a plurality of parallel-type PSSs having respective stabilization functions 10 that are different from each other.

(Seventy-third Embodiment)

This embodiment of multiple PSS 5' comprises a Δδ-PSS that is a parallel-type PSS adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal of the internal phase angle of the generator 1 generated from the difference of the signal of the phase angle of the rotor of the generator 1 and that of voltage Vg3A of the generator 1 are fed to the adder A3 respectively by way of the stabilization function Gp(S) 13, the stabilization function Gw(S) 14 and the stabilization function Gδ(S) 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δδ-PSS having stabilization function Gw(S) 14, whereas power fluctuations of system mode are suppressed by the Δδ-PSS that is a parallel-type PSS having stabilization function Gδ(S) 10 and adapted to receive as input the signal of the internal phase angle of the generator 1 generated from the difference of the signal of the phase angle of the rotor of the generator 1 and that of voltage Vg3A of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Seventy-fourth Embodiment)

This embodiment of multiple PSS 5' comprises a Δδ-PSS that is a parallel-type PSS adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal phase angle of the generator 1 generated from the difference of the signal of the phase angle of the rotor of the generator 1 and that of voltage Vg3A of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the internal phase angle of the generator 1 generated from the difference of the signal of the phase angle of the rotor of the generator 1 and that of voltage Vg3A of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the phase angle of the rotor of the generator 1 and that of voltage Vg3A of the generator 1 can suppress the power fluctuations for which the stabilization function is responsible.

(Seventy-fifth Embodiment)

This embodiment of multiple PSS 5' comprises a Δδ-PSS that is a parallel-type PSS adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the third embodiment as illustrated in FIG. 11 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed $\omega$ 9 of the rotor of the generator 1 and the control constants including the gain and the advance/delay constant of the parallel-type PSS adapted to receive as input the signal of the internal phase angle of the generator 1 generated from the difference of the signal of the phase angle of the rotor of the generator 1 and that of voltage Vg3A of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the internal phase angle of the generator 1 generated from the difference of the signal of the phase angle of the rotor of the generator 1 and that of voltage Vg3A of the generator 1 as to suppress the target power fluctuations most effectively in response to the power fluctuations existing in the system. In this way, each parallel-type PSS adapted as input to receive the signal of the internal phase angle of the generator 1 generated from the difference of the signal of the phase angle of the rotor of the generator 1 and that of voltage Vg3A of the generator 1 can suppress the power fluctuations for which the stabilization function is responsible.

(Seventy-sixth Embodiment)

This embodiment of multiple PSS 5' comprises as parallel-type PSS a plurality of (N) $\Delta\delta$-PSSs adapted to use as input a signal of the internal phase angle of the generator 1 generated from the difference of the signal of the phase angle of the rotor of the generator 1 and that of voltage Vg3A of the generator 1 in place of the change $\Delta\omega$ 9A in the rotational speed $\omega$ 9 of the rotor of the generator 1 of the fourth embodiment as illustrated in FIG. 14 and having respective stabilization functions G$\delta$(S) 10A through 10N that include a phase advance/delay compensation function and compensate the phase delay in-phase with the phase angle signal of the rotor of the generator 1 for the input signal, said $\Delta\delta$-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal of the internal phase angle of the generator 1 generated from the difference of the signal of the phase angle of the rotor of the generator 1 and that of voltage Vg3A of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the phase angle of the rotor of the generator 1 and that of voltage Vg3A of the generator 1 can suppress the power fluctuations for which the stabilization function is responsible.

(Seventy-seventh Embodiment)

This embodiment of multiple PSS 5' comprises as parallel-type PSS a plurality of (more specifically a pair of) $\Delta\delta$-PSSs adapted to use as input a signal of the internal phase angle of the generator 1 generated from the difference of the signal of the phase angle of the rotor of the generator 1 and that of voltage Vg3A of the generator 1 in place of the change $\Delta\omega$ 9A in the rotational speed $\omega$ 9 of the rotor of the generator 1 of the fifth embodiment as illustrated in FIG. 15 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the ($\Delta$P+$\Delta\omega$)-PSS that is a PSS of conventional type realized by combining a $\Delta$P-PSS having stabilization function Gp(S) 13 and $\Delta\omega$-PSS having stabilization function Gw(S) 14, whereas power fluctuations of a plurality of system modes showing much different frequencies are suppressed by the $\Delta\delta$-PSS that comprises a plurality of parallel-type PSSs having stabilization function G$\delta$(S) 10 and receives as input the signal of the internal phase angle of the generator 1 generated from the difference of the signal of the phase angle of the rotor of the generator 1 and that of voltage Vg3A of the generator 1.

The control constants of the stabilization function 10 as shown in (formula 3) are so selected for each parallel-type PSS adapted to receive as input the signal of the internal phase angle of the generator 1 generated from the difference of the signal of the phase angle of the rotor of the generator 1 and that of voltage Vg3A of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the phase angle of the rotor of the generator 1 and that of voltage Vg3A of the generator 1 can suppress the power fluctuations for which the stabilization function is responsible.

(Seventy-eighth Embodiment)

This embodiment of multiple PSS 5' comprises as parallel-type PSS a plurality of (more specifically a pair of) $\Delta\delta$-PSSs adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the sixth embodiment as illustrated in FIG. 16 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δω-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal of the internal phase angle of the generator 1 generated from the difference of the signal of the phase angle of the rotor of the generator 1 and that of voltage Vg3A of the generator 1.

The control constants of the stabilization function 10 as shown in (formula 3) are so selected for each parallel-type PSS adapted to receive as input the signal of the internal phase angle of the generator 1 generated from the difference of the signal of the phase angle of the rotor of the generator 1 and that of voltage Vg3A of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the phase angle of the rotor of the generator 1 and that of voltage Vg3A of the generator 1 can suppress the power fluctuations for which the stabilization function is responsible.

(Seventy-ninth Embodiment)

This embodiment of multiple PSS 5' comprises a Δδ-PSS that is a parallel-type PSS adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the seventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal of the internal phase angle of the generator 1 generated from the difference of the signal of the phase angle of the rotor of the generator 1 and that of voltage Vg3A of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal of the internal phase angle of the generator 1 generated from the difference of the signal of the phase angle of the rotor of the generator 1 and that of voltage Vg3A of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal of the internal phase angle of the generator 1 generated from the difference of the signal of the phase angle of the rotor of the generator 1 and that of voltage Vg3A of the generator 1 so as to suppress power fluctuations of system mode because only such fluctuations are problematic to the generator 1.

(Eightieth Embodiment)

This embodiment of multiple PSS 5' comprises a Δδ-PSS that is a parallel-type PSS adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal phase angle of the generator 1 generated from the difference of the signal of the phase angle of the rotor of the generator 1 and that of voltage Vg3A of the generator 1 are automatically selected by the constant selecting section 53 out of a number of constants stored in advance by taking various system conditions into consideration according to the frequency detected by the power-fluctuation frequency detecting section 51.

(Eighty-first Embodiment)

This embodiment of multiple PSS 5' comprises a Δδ-PSS that is a parallel-type PSS adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal phase angle of the generator 1 generated from the difference of the signal of the phase angle of the rotor of the generator 1 and that of voltage Vg3A of the generator 1 are automatically computed by the constant computing section 54 by using the formulas selected in advance according to the frequency as detected by the power-fluctuation frequency detecting section 51.

(Eighty-second Embodiment)

This embodiment of multiple PSS 5' comprises as parallel-type PSS a plurality of (N) Δδ-PSSs adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal of the internal phase angle of the generator 1 generated from the difference of the signal of the phase angle of the rotor of the generator 1 and that of voltage Vg3A of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the phase angle of the rotor of the generator 1 and that of voltage Vg3A of the generator 1 can suppress the power fluctuations for which the stabilization function is responsible.

(Eighty-third Embodiment)

This embodiment of multiple PSS 5' comprises as parallel-type PSS a plurality of (more specifically a pair of) Δδ-PSSs adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSS. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the internal phase angle of the generator 1 generated from the difference of the signal of the phase angle of the rotor of the generator 1 and that of voltage Vg3A of the generator 1 and comprising a plurality of parallel-type PSSs having respective stabilization functions 10 that are different from each other.

(Eighty-fourth Embodiment)

This embodiment of multiple PSS 5' comprises as parallel-type PSS a plurality of (more specifically a pair of) Δδ-PSSs adapted to use as input a signal of the internal phase angle of the generator 1 generated from the difference of the signal of the phase angle of the rotor of the generator 1 and that of voltage Vg3A of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the internal phase angle of the generator 1 generated from the difference of the signal of the phase angle of the rotor of the generator 1 and that of voltage Vg3A of the generator 1 and comprising a plurality of parallel-type PSSs having respective stabilization functions 10 that are different from each other.

(Eighty-fifth Embodiment)

This embodiment of multiple PSS 5' comprises a Δδ-PSS that is a parallel-type PSS adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal of the internal phase angle of the generator 1 generated from the difference of the signal of the internal voltage phase of the generator 1 generated by combining the signal of voltage Vg3A and that of the current of the generator 1 and the signal are fed to the adder A3 respectively by way of the stabilization function Gp(S) 13, the stabilization function Gw(S) 14 and the stabilization function Gδ(S) 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δω-PSS having stabilization function Gw(S) 14, whereas power fluctuations of system mode are suppressed by the Δδ-PSS that is a parallel-type PSS having stabilization function Gδ(S) 10 and adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Eighty-sixth Embodiment)

This embodiment of multiple PSS 5' comprises a Δδ-PSS that is a parallel-type PSS adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 can suppress the power fluctuations for which the stabilization function is responsible.

(Eighty-seventh Embodiment)

This embodiment of multiple PSS 5' comprises a Δδ-PSS that is a parallel-type PSS adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the third embodiment as illustrated in FIG. 11 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 as to suppress the target power fluctuations most effectively in response to the power fluctuations existing in the system. In this way, each parallel-type PSS adapted as input to receive the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 can suppress the power fluctuations for which the stabilization function is responsible.

(Eighty-eighth Embodiment)

This embodiment of multiple PSS 5' comprises as parallel-type PSS a plurality of (N) Δδ-PSSs adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the fourth embodiment as illustrated in FIG. 14 and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 can suppress the power fluctuations for which the stabilization function is responsible.

(Eighty-ninth Embodiment)

This embodiment of multiple PSS 5' comprises as parallel-type PSS a plurality of (more specifically a pair of) $\Delta\delta$-PSSs adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change $\Delta\omega$ 9A in the rotational speed $\omega$ 9 of the rotor of the generator 1 of the fifth embodiment as illustrated in FIG. 15 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the ($\Delta$P+$\Delta\omega$)-PSS that is a PSS of conventional type realized by combining a $\Delta$P-PSS having stabilization function Gp(S) 13 and $\Delta\omega$-PSS having stabilization function Gw(S) 14, whereas power fluctuations of a plurality of system modes showing much different frequencies are suppressed by the $\Delta\delta$-PSS that comprises a plurality of parallel-type PSSs having stabilization function G$\delta$(S) 10 and receives as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1.

The control constants of the stabilization function 10 as shown in (formula 3) are so selected for each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 can suppress the power fluctuations for which the stabilization function is responsible.

(Ninetieth Embodiment)

This embodiment of multiple PSS 5' comprises as parallel-type PSS a plurality of (more specifically a pair of) $\Delta\delta$-PSSs adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change $\Delta\omega$ 9A in the rotational speed $\omega$ 9 of the rotor of the generator 1 of the sixth embodiment as illustrated in FIG. 16 and having stabilization function G$\delta$(S) 10 that includes a phase advance/delay compensation function and compensates the phase delay in-phase with the phase angle signal of the rotor of the generator 1 for the input signal, said $\Delta\delta$-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the ($\Delta$P+$\Delta\omega$)-PSS that is a PSS of conventional type realized by combining a $\Delta$P-PSS having stabilization function Gp(S) 13 and $\Delta\omega$-PSS having stabilization function Gw(S) 14, whereas power fluctuations of a plurality of system modes showing much different frequencies are suppressed by the $\Delta\delta$-PSS that comprises a plurality of parallel-type PSSs having stabilization function G$\delta$(S) 10 and receives as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1.

The control constants of the stabilization function 10 as shown in (formula 3) are so selected for each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 can suppress the power fluctuations for which the stabilization function is responsible.

(Ninety-first Embodiment)

This embodiment of multiple PSS 5' comprises a $\Delta\delta$-PSS that is a parallel-type PSS adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the seventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 so as to suppress power fluctuations of system mode because only such fluctuations are problematic to the generator 1.

(Ninety-second Embodiment)

This embodiment of multiple PSS 5' comprises a Δδ-PSS that is a parallel-type PSS adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 are automatically selected by the constant selecting section 53 out of a number of constants stored in advance by taking various system conditions into consideration according to the frequency detected by the power-fluctuation frequency detecting section 51.

(Ninety-third Embodiment)

This embodiment of multiple PSS 5' comprises a Δδ-PSS that is a parallel-type PSS adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 are automatically computed by the constant computing section 54 by using the formulas selected in advance according to the frequency as detected by the power-fluctuation frequency detecting section 51.

(Ninety-fourth Embodiment)

This embodiment of multiple PSS 5' comprises as parallel-type PSS a plurality of (N) Δδ-PSSs adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 as to suppress the target power fluctuations most effectively in response to the power fluctuations existing in the system. In this way, each parallel-type PSS adapted to receive as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 can suppress the power fluctuations for which the stabilization function is responsible.

(Ninety-fifth Embodiment)

This embodiment of multiple PSS 5' comprises as parallel-type PSS a plurality of (more specifically a pair of) Δδ-PSSs adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 and comprising a plurality of parallel-type PSSs having respective stabilization functions 10 that are different from each other.

(Ninety-sixth Embodiment)

This embodiment of multiple PSS 5' comprises as parallel-type PSS a plurality of (more specifically a pair of) Δδ-PSSs adapted to use as input a signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the internal phase angle of the generator 1 generated from the difference of the signal of the internal voltage phase of the generator 1 generated by combining the signal of voltage Vg3A and that of the current of the generator 1 and the signal of the voltage phase of the generator 1 and comprising a plurality of parallel-type PSSs having respective stabilization functions 10 that are different from each other.

(Ninety-seventh Embodiment)

This embodiment of multiple PSS 5' comprises a Δδ-PSS that is a parallel-type PSS adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal of the internal voltage phase of the generator 1 generated by combining the signal of voltage Vg3A and that of the current of the generator 1 are fed to the adder A3 respectively by way of the stabilization function Gp(S) 13, the stabilization function Gw(S) 14 and the stabilization function Gδ(S) 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δω-PSS having stabilization function Gw(S) 14, whereas power fluctuations of system mode are suppressed by the Δδ-PSS that is a parallel-type PSS having stabilization function Gδ(S) 10 and adapted to receive as input the signal of the internal voltage phase of the generator 1 generated by combining the signal of voltage Vg3A and that of the current of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(Ninety-eighth Embodiment)

This embodiment of multiple PSS 5' comprises a Δδ-PSS that is a parallel-type PSS adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal voltage phase of the generator 1 generated by combining the signal of voltage Vg3A and that of the current of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the internal voltage phase of the generator 1 generated by combining the signal of voltage Vg3A and that of the current of the generator 1 as to suppress the target power fluctuations most effectively in response to the power fluctuations existing in the system. In this way, each parallel-type PSS adapted to receive as input the signal of the internal voltage phase of the generator 1 generated by combining the signal of voltage Vg3A and that of the current of the generator 1 can suppress the power fluctuations for which the stabilization function is responsible.

(Ninety-ninth Embodiment)

This embodiment of multiple PSS 5' comprises a Δδ-PSS that is a parallel-type PSS adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the third embodiment as illustrated in FIG. 11 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal voltage phase of the generator 1 generated by combining the signal of voltage Vg3A and that of the current of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the internal voltage phase of the generator 1 generated by combining the signal of voltage Vg3A and that of the current of the generator 1 as to suppress the target power fluctuations most effectively in response to the power fluctuations existing in the system. In this way, each parallel-type PSS adapted as input to receive the signal of the internal voltage phase of the generator 1 generated by combining the signal of voltage Vg3A and that of the current of the generator 1 can suppress the power fluctuations for which the stabilization function is responsible.

(One Hundredth Embodiment)

This embodiment of multiple PSS 5' comprises as parallel-type PSS a plurality of (N) Δδ-PSSs adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the fourth embodiment as illustrated in FIG. 14 and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through 10N as shown in (formula 3) are so selected for each parallel-type PSS adapted to receive as input the signal of the internal voltage phase of the generator 1 generated by combining the signal of voltage Vg3A and that of the current of the generator 1 as to suppress the target power fluctuations most effectively in response to the power fluctuations existing in the system. In this way, each parallel-type PSS adapted to receive as input the signal of the internal voltage phase of the generator 1 generated by combining the signal of voltage Vg3A and that of the current of the generator 1 can suppress the power fluctuations for which the stabilization function is responsible.

(One Hundred-first Embodiment)

This embodiment of multiple PSS 5' comprises as parallel-type PSS a plurality of (more specifically a pair of) Δδ-PSSs adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the fifth embodiment as illustrated in FIG. 15 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δω-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal of the internal voltage phase of the generator 1 generated by combining the signal of voltage Vg3A and that of the current of the generator 1.

The control constants of the stabilization function 10 as shown in (formula 3) are so selected for each parallel-type PSS adapted to receive as input the signal of the internal voltage phase of the generator 1 generated by combining the signal of voltage Vg3A and that of the current of the generator 1 as to suppress the target power fluctuations most effectively in response to the power fluctuations existing in the system. In this way, each parallel-type PSS adapted to receive as input the signal of the internal voltage phase of the generator 1 generated by combining the signal of voltage Vg3A and that of the current of the generator 1 can suppress the power fluctuations for which the stabilization function is responsible.

(One Hundred-second Embodiment)

This embodiment of multiple PSS 5' comprises as parallel-type PSS a plurality of (more specifically a pair of) Δδ-PSSs adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the sixth embodiment as illustrated in FIG. 16 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δω-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal of the internal voltage phase of the generator 1 generated by combining the signal of voltage Vg3A and that of the current of the generator 1.

The control constants of the stabilization function 10 as shown in (formula 3) are so selected for each parallel-type PSS adapted to receive as input the signal of the internal voltage phase of the generator 1 generated by combining the signal of voltage Vg3A and that of the current of the generator 1 as to suppress the target power fluctuations most effectively in response to the power fluctuations existing in the system. In this way, each parallel-type PSS adapted to receive as input the signal of the internal voltage phase of the generator 1 generated by combining the signal of voltage Vg3A and that of the current of the generator 1 can suppress the power fluctuations for which the stabilization function is responsible.

(One Hundred-third Embodiment)

This embodiment of multiple PSS 5' comprises a Δδ-PSS that is a parallel-type PSS adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the seventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal of the internal voltage phase of the generator 1 generated by combining the signal of voltage Vg3A and that of the current of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal of the internal voltage phase of the generator 1 generated by combining the signal of voltage Vg3A and that of the current of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal of the internal voltage phase of the generator 1 generated by combining the signal of voltage Vg3A and that of the current of the generator 1 so as to suppress power fluctuations of system mode because only such fluctuations are problematic to the generator 1.

(One Hundred-fourth Embodiment)

This embodiment of multiple PSS 5' comprises a Δδ-PSS that is a parallel-type PSS adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this that of the current of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the internal voltage phase of the generator 1 generated by combining the signal of voltage Vg3A and that of the current of the generator 1 are automatically selected by the constant selecting section 53 out of a number of constants stored in advance by taking various system conditions into consideration according to the frequency detected by the power-fluctuation frequency detecting section 51.

(One Hundred-fifth Embodiment)

This embodiment of multiple PSS 5' comprises a Δδ-PSS that is a parallel-type PSS adapted to use as input a signal of the internal voltage phase of the generator 1 generated by combining the signal of voltage Vg3A and advance/delay constant of the parallel-type PSS adapted to receive as input the signal of the internal voltage phase of the generator 1 generated by combining the signal of voltage Vg3A and that of the current of the generator 1 are automatically computed by the constant computing section 54 by using the formulas selected in advance according to the frequency as detected by the power-fluctuation frequency detecting section 51.

(One Hundred-sixth Embodiment)

This embodiment of multiple PSS 5' comprises as parallel-type PSS a plurality of (N) Δδ-PSSs adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal of the internal voltage phase of the generator 1 generated by combining the signal of voltage Vg3A and that of the current of the generator 1 as to suppress the target power fluctuations most effectively in response to the power fluctuations existing in the system. In this way, each parallel-type PSS adapted to receive as input the signal of the internal voltage phase of the generator 1 generated by combining the signal of voltage Vg3A and that of the current of the generator 1 can suppress the power fluctuations for which the stabilization function is responsible.

(One Hundred-seventh Embodiment)

This embodiment of multiple PSS 5' comprises as parallel-type PSS a plurality of (more specifically a pair of) Δδ-PSSs adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the internal voltage phase of the generator 1 generated by combining the signal of voltage Vg3A and that of the current of the generator 1 and comprising a plurality of parallel-type PSSs having respective stabilization functions 10 that are different from each other.

(One Hundred-eighth Embodiment)

This embodiment of multiple PSS 5' comprises as parallel-type PSS a plurality of (more specifically a pair of) Δδ-PSSs adapted to use as input a signal of the internal voltage phase of the generator 1 generated by combining the signal of voltage Vg3A and that of the current of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the internal voltage phase of the generator 1 generated by combining the signal of voltage Vg3A and that of the current of the generator 1 and comprising a plurality of parallel-type PSSs having respective stabilization functions 10 that are different from each other.

(One Hundred-ninth Embodiment)

This embodiment of multiple PSS 5' comprises a Δδ-PSS that is a parallel-type PSS adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δ107 9A in the rotational speed ω 9 of the rotor of the generator 1 of the first embodiment as illustrated in FIG. 9 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described first embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the first embodiment will be discussed here. Otherwise, the description of the operation of the first embodiment also applies to this embodiment.

With this multiple PSS 5', the change −ΔP of the active power 8, the change Δω 9A of the rotational speed ω 9 of the generator 1 and the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 are fed to the adder A3 respectively by way of the stabilization function Gp(S) 13, the stabilization function Gw(S) 14 and the stabilization function Gδ(S) 10 and added by the adder A3 to obtain the output signal 5A of the multiple PSS that is output to the AVR 4 as shown in FIG. 2.

Then, power fluctuations of adjacent generator mode and those of generator mode are suppressed by the (ΔP+Δω)-PSS that is a PSS of conventional type realized by combining a ΔP-PSS having stabilization functions Gp(S) 13 and Δω-PSS having stabilization function Gw(S) 14, whereas power fluctuations of system mode are suppressed by the Δδ-PSS that is a parallel-type PSS having stabilization function Gδ(S) 10 and adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1.

With this sharing arrangement, it is possible to quickly suppress power fluctuations occurring in operating power systems over a broad cycle zone ranging from fluctuations of generator mode to fluctuations of system mode in order to stabilize power systems and secure power interchange over a large area on a stable basis.

(One Hundred-tenth Embodiment)

This embodiment of multiple PSS 5' comprises a Δδ-PSS that is a parallel-type PSS adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the second embodiment as illustrated in FIG. 10 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described second embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the second embodiment will be discussed here. Otherwise, the description of the operation of the second embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 as to suppress the target power fluctuations most effectively in response to the power fluctuations existing in the system. In this way, each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 can suppress the power fluctuations for which the stabilization function is responsible.

(One Hundred-eleventh Embodiment)

This embodiment of multiple PSS 5' comprises a Δδ-PSS that is a parallel-type PSS adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the third embodiment as illustrated in FIG. 11 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described third embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the third embodiment will be discussed here. Otherwise, the description of the operation of the third embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 are automatically selected by the constant selecting section 53 out of a number of constants stored in advance by taking various system conditions into consideration according to the frequency detected by the power-fluctuation frequency detecting section 51.

As the stabilization function 10 as shown in (formula 3) is so arranged for each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 as to suppress the target power fluctuations most effectively in response to the power fluctuations existing in the system. In this way, each parallel-type PSS adapted as input to receive the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1 that of voltage Vg3A of the generator 1 and that of the current of the generator 1 can suppress the power fluctuations for which the stabilization function is responsible.

(One Hundred-twelfth Embodiment)

This embodiment of multiple PSS 5' comprises as parallel-type PSS a plurality of (N) Δδ-PSSs adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the fourth embodiment as illustrated in FIG. 14 and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described fourth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the fourth embodiment will be discussed here. Otherwise, the description of the operation of the fourth embodiment also applies to this embodiment.

The control constants of the stabilization functions 10A through ION as shown in (formula 3) are so selected for each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 as to suppress the target power fluctuations most effectively in response to the power fluctuations existing in the system. In this way, each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 can suppress the power fluctuations for which the stabilization function is responsible.

(One Hundred-thirteenth Embodiment)

This embodiment of multiple PSS 5' comprises as parallel-type PSS a plurality of (more specifically a pair of) Δδ-PSSs adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the fifth embodiment as illustrated in FIG. 15 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described fifth embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the fifth embodiment will be discussed here. Otherwise, the description of the operation of the fifth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δω-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1.

The control constants of the stabilization function 10 as shown in (formula 3) are so selected for each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 as to suppress the target power fluctuations most effectively in response to the power fluctuations existing in the system. In this way, each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 can suppress the power fluctuations for which the stabilization function is responsible.

(One Hundred-fourteenth Embodiment)

This embodiment of multiple PSS 5' comprises as parallel-type PSS a plurality of (more specifically a pair of)

Δδ-PSSs adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the sixth embodiment as illustrated in FIG. 16 and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described sixth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the sixth embodiment will be discussed here. Otherwise, the description of the operation of the sixth embodiment also applies to this embodiment.

Then, power fluctuations of generator mode are suppressed mainly by the (ΔP+Δω)-PSS that is a PSS of conventional type realized by combining a ΔP-PSS having stabilization function Gp(S) 13 and Δω-PSS having stabilization function Gw(S) 14, whereas power fluctuations of a plurality of system modes showing much different frequencies are suppressed by the Δδ-PSS that comprises a plurality of parallel-type PSSs having stabilization function Gδ(S) 10 and receives as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1.

The control constants of the stabilization function 10 as shown in (formula 3) are so selected for each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 as to suppress the target power fluctuations most effectively in response to the power fluctuations existing in the system. In this way, each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 can suppress the power fluctuations for which the stabilization function is responsible.

(One Hundred-fifteenth Embodiment)

This embodiment of multiple PSS 5' comprises a Δδ-PSS that is a parallel-type PSS adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the seventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described seventh embodiment and hence will not be described here any further. Therefore, this embodiment will be understood by referring to FIGS. 8 and 9.

Now, the operation of the multiple PSS 5' of this embodiment having the above described configuration will described below.

Note, however, that only the operation of the part of this embodiment that is different from the seventh embodiment will be discussed here. Otherwise, the description of the operation of the seventh embodiment also applies to this embodiment.

With this multiple PSS 5', the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 is input to the AVR 4 as output signal 5A of the multiple PSS by way of the stabilization function Gp(S) 10.

Then, power fluctuations of system mode are suppressed by the ΔP-PSS that is a parallel-type PSS adapted to use as input a signal of the combination of the signal of the rotational speed ω9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 and having stabilization function Gδ(S) 10 selected so as to be adaptable to such power-fluctuations.

More specifically, as for the generator 1, the stabilization function Gδ(S) 10 shown in (formula 3) is selected for the parallel-type PSS of the multiple PSS 5' adapted to use as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 so as to suppress power fluctuations of system mode because only such fluctuations are problematic to the generator 1.

(One Hundred-sixteenth Embodiment)

This embodiment of multiple PSS 5' comprises a Δδ-PSS that is a parallel-type PSS adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the eighth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eighth embodiment and hence will not be described here any further. Therefore, this embodiment will be understood by referring to FIGS. 8 and 12.

Now, the operation of the multiple PSS 5' of this embodiment having the above described configuration will described below.

Note, however, that only the operation of the part of this embodiment that is different from the eighth embodiment will be discussed here. Otherwise, the description of the operation of the eighth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 are automatically selected by the constant selecting section 53 out of a number of constants stored in advance by taking various system conditions into consideration according to the frequency detected by the power-fluctuation frequency detecting section 51.

(One Hundred-seventeenth Embodiment)

This embodiment of multiple PSS 5' comprises a Δδ-PSS that is a parallel-type PSS adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the ninth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described ninth embodiment and hence will not be described here any further. Therefore, this embodiment will be understood by referring to FIGS. 8 and 13.

Now, the operation of the multiple PSS 5' of this embodiment having the above described configuration will described below.

Note, however, that only the operation of the part of this embodiment that is different from the ninth embodiment will be discussed here. Otherwise, the description of the operation of the ninth embodiment also applies to this embodiment.

When the power-fluctuation frequency of the generator 1 deviates from the expected frequency, the power-fluctuation frequency detecting section 51 detects the power-fluctuation frequency from the rotational speed ω 9 of the rotor of the generator 1 and the control constants including the gain and the advance/delay constant of the parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 are automatically computed by the constant computing section 54 by using the formulas selected in advance according to the frequency as detected by the power-fluctuation frequency detecting section 51.

(One Hundred-eighteenth Embodiment)

This embodiment of multiple PSS 5' comprises as parallel-type PSS a plurality of (N) Δδ-PSSs adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the tenth embodiment and having respective stabilization functions Gδ(S) 10A through 10N that include a phase advance/delay compensation function and compensate the phase delay in-phase with the phase angle signal of the rotor of the generator 1 for the input signal, said Δδ-PSSs being also adapted to suppress long cycle power fluctuations of system mode.

Otherwise, this embodiment is same as the above described tenth embodiment and hence will not be described here any further. Therefore, this embodiment will be understood by referring to FIGS. 8 and 14.

Now, the operation of the multiple PSS 5' of this embodiment having the above described configuration will described below.

Note, however, that only the operation of the part of this embodiment that is different from the tenth embodiment will be discussed here. Otherwise, the description of the operation of the tenth embodiment also applies to this embodiment.

The control constants of the stabilization functions 10A through 10N as shown in (formula 3) are so selected for each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 as to suppress the target power fluctuations most effectively in response to the power fluctuations existing in the system. In this way, each parallel-type PSS adapted to receive as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 can suppress the power fluctuations for which the stabilization function is responsible.

(One Hundred-nineteenth Embodiment)

This embodiment of multiple PSS 5' comprises as parallel-type PSS a plurality of (more specifically a pair of) Δδ-PSSs adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the eleventh embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described eleventh embodiment and hence will not be described here any further. Therefore, this embodiment will be understood by referring to FIGS. 8 and 15.

Now, the operation of the multiple PSS 5' of this embodiment having the above described configuration will described below.

Note, however, that only the operation of the part of this embodiment that is different from the eleventh embodiment will be discussed here. Otherwise, the description of the operation of the eleventh embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 and comprising a plurality of parallel-type PSSs having respective stabilization functions 10 that are different from each other.

(One Hundred-twentieth Embodiment)

This embodiment of multiple PSS 5' comprises as parallel-type PSS a plurality of (more specifically a pair of) Δδ-PSSs adapted to use as input a signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 in place of the change Δω 9A in the rotational speed ω 9 of the rotor of the generator 1 of the twelfth embodiment and having stabilization function Gδ(S) 10 that includes a phase advance/delay compensation function and compensates the phase delay in-phase with the phase angle signal of the rotor of the generator 1 for the input signal, said Δδ-PSS being also adapted to suppress long cycle power fluctuations of system mode.

Otherwise, this embodiment is same as the above described twelfth embodiment and hence will not be described here any further. Therefore, this embodiment will be understood by referring to FIGS. 8 and 16.

Now, the operation of the multiple PSS 5' of this embodiment having the above described configuration will described below.

Note, however, that only the operation of the part of this embodiment that is different from the twelfth embodiment will be discussed here. Otherwise, the description of the operation of the twelfth embodiment also applies to this embodiment.

With this embodiment, if the difference between the cycle of power fluctuations occurring during the day when the load of the system is heavy and that of power fluctuations occurring during the night when the load of the system is light is large and its influence is severe or if the cycle of power fluctuations varies greatly due to changes in the power interchange so that more rigorous conditions have to be applied to the system, control constants that are more delicate than those of the second embodiment will be selected for the stabilization functions of the parallel-type PSSs. Then, the output signals S3 of these parallel-type PSSs are added to obtain the output signal S5 of the multiple PSS that is output to the AVR 4.

The power-fluctuations of system mode of a plurality of systems that vary greatly in terms of frequency are suppressed by the Δδ-PSS adapted to use as input the signal of the combination of the signal of the rotational speed ω 9 of the rotor of the generator 1, that of the frequency of the voltage of the generator 1, that of the frequency of the current of the generator 1, that of the active power P8 of the generator 1, that of the guide vane opening of the water wheel, that of the valve opening of the turbine directly linked to the generator 1, that of the phase angle of the rotor of the generator 1, that of the phase of voltage Vg3A of the generator 1, that of voltage Vg3A of the generator 1 and that of the current of the generator 1 and comprising a plurality of parallel-type PSSs having respective stabilization functions 10 that are different from each other.

The present invention provides a PSS that can quickly suppress power fluctuations that may usually occur over a broad cycle zone, ranging from fluctuations of generator mode (having a short cycle of about 0.5 seconds) to fluctuations of system mode (having a long cycle of about 10 seconds), in order to stabilize power systems and secure power interchange over a broad area on a stable basis and is applicable to both a static exciting system and a rotary exciting system, without adversely affecting the shaft-twisting vibration of the turbines or generators.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for stabilizing a power system, to be incorporated into an excitation control system of a rotating type generator in order to attenuate power fluctuations, said apparatus comprising:

a short-cycle stabilizing section for computationally determining a short-cycle stabilizing signal for suppressing short-cycle power fluctuations in accordance with a rotational speed signal of a rotor of said generator and an active power signal of said generator;

a long-cycle stabilizing section having a stabilization function including a phase compensation function adapted to compensate a phase delay relative to the rotational speed signal of said rotor so that said rotational speed signal is in phase with a phase angle signal of said rotor, for computationally determining a long-cycle stabilizing signal for suppressing long-cycle power fluctuations having a cycle time longer than short-cycle power fluctuations according to the rotational speed signal of said rotor, wherein, said long-cycle stabilizing section has a replacing section adapted to replace said rotational speed signal with at least one of, a signal of the frequency of the voltage of said generator, a signal of the electric current of said generator, an active power signal of said generator, a rotational speed signal generated by combining a signal of a guide vane opening of a water wheel linked to said generator and the signal of the active power of said generator, a rotational speed signal generated by combining a signal of a valve opening of the turbine linked to said generator and the signal of the active power of said generator, an internal phase signal of the generator generated by combining the phase angle signal of said rotor and a voltage phase signal of said generator, an internal phase signal of the generator generated by combining the voltage signal and a current signal of said generator, a phase angle signal of said rotor generated by combining the active power signal of said generator and the voltage signal of said generator, and an internal voltage phase signal of the generator generated by combining the voltage signal and the current signal of said generator; and an output section for producing a sum signal of said short-cycle stabilizing signal and said long-cycle stabilizing signal, and outputting the sum signal to said excitation control system.

2. An apparatus for stabilizing a power system according to claim 1, wherein:

said long-cycle stabilizing section has a control constant altering section adapted to automatically alter the control constants of said stabilization function in accordance with said frequency of long-cycle power fluctuations.

3. An apparatus for stabilizing a power system, to be incorporated into an excitation control system of a rotating type generator in order to attenuate power fluctuations, said apparatus comprising:

a short-cycle stabilizing section for computationally determining a short-cycle stabilizing signal for suppressing short-cycle power fluctuations in accordance with a rotational speed signal of a rotor and an active power signal of said generator;

a long-cycle stabilizing section having a stabilization function including a phase compensation function adapted to compensate a phase delay relative to the rotational speed signal of said rotor so that said rotational speed signal is in phase with a phase angle signal of said rotor, for computationally determining a long-cycle stabilizing signal for suppressing long-cycle power fluctuations having a cycle time longer than short-cycle power fluctuations according to the rotational speed signal of said rotor, wherein, said long-cycle stabilizing section includes a plurality of long-cycle stabilizing sections, wherein, each of said plurality of long-cycle stabilizing sections has a stabilization function including a phase compensation function adapted to compensate the phase delay relative to the rotational speed signal of said rotor so as to match said rotational speed signal to be in phase with the phase angle signal of said rotor, said stabilization functions of said long-cycle stabilizing sections having respective control constants that are different from each other; and an output section for producing a sum signal of said short-cycle stabilizing signal and said long-cycle stabilizing signal, and outputting the sum signal to said excitation control system.

4. An apparatus for stabilizing a power system, to be incorporated into an excitation control system of a rotating type generator in order to attenuate power fluctuations, said apparatus comprising:

a short-cycle stabilizing section for computationally determining a short-cycle stabilizing signal for suppressing short-cycle power fluctuations in accordance with a rotational speed signal of a rotor and an active power signal of said generator, wherein, said short-cycle stabilizing section includes a first suppressing section having a first stabilization function for suppressing short-cycle power fluctuations on the basis of the change in the active power signal of said generator and a second suppressing section having a second stabilization function for suppressing short-cycle power fluctuations on the basis of the change in the rotational speed signal of said rotor;

a long-cycle stabilizing section having a stabilization function including a phase compensation function adapted to compensate a phase delay relative to the rotational speed signal of said rotor so that said rotational speed signal is in phase with a phase angle signal of said rotor, for computationally determining a long-cycle stabilizing signal for suppressing long-cycle power fluctuations having a cycle time longer than short-cycle power fluctuations according to the rotational speed signal of said rotor, wherein, said long cycle stabilizing section includes at least a third suppression section having a third stabilization function including a phase compensation function adapted to compensate the phase delay relative to the rotational speed signal of said rotor so as to match said rotational speed signal to be in phase with the phase angle signal of said rotor on the basis of the change in the phase angle signal of said rotor; and an output section for producing a sum signal of said short-cycle stabilizing signal and said long-cycle stabilizing signal, and outputting the sum signal to said excitation control system, wherein, said output section includes an adder section for adding the outputs of said first suppressing section, said second suppressing section and said third suppressing section and applying the addition signal to a magnetic excitation control system.

5. An apparatus for stabilizing a power system, to be incorporated into an excitation control system of a rotating type generator in order to attenuate power fluctuations, said apparatus comprising:

a stabilizing section having stabilization function including a phase compensation function adapted to compensate a phase delay relative to a rotational speed signal of a rotor so that said rotational speed signal is in phase with a phase angle signal of said rotor, for computationally determining a stabilizing signal for suppressing power fluctuations according to the rotational speed signal of said rotor, wherein, said stabilizing section has a replacing section adapted to replace said rotational speed signal with at least one of, a signal of a frequency of a voltage of said generator, a signal of an electric current of said generator, an active power signal of said generator, a rotational speed signal generated by combining the signal of a guide vane opening of a water wheel linked to said generator and the signal of the active power of said generator, a rotational speed signal generated by combining the signal of a valve opening of a turbine linked to said generator and the signal of the active power of said generator, an internal phase signal of the generator generated by combining the phase angle signal of said rotor and a voltage phase signal of said generator, an internal phase signal of the generator generated by combining the voltage signal and the current signal of said generator, a phase angle signal of said rotor generated by combining the active power signal of said generator and the voltage signal of said generator, and an internal voltage phase signal of the generator generated by combining the voltage signal and the current signal of said generator; and an output section for outputting said stabilizing signal to said excitation control system.

6. An apparatus for stabilizing a power system according to claim 5, wherein:

said stabilizing section has a control constant altering section adapted to automatically alter the control constants of said stabilization function in accordance with said frequency of long-cycle power fluctuations.

7. An apparatus for stabilizing a power system, to be incorporated into an excitation control system of a rotating type generator in order to attenuate power fluctuations, said apparatus comprising:

a stabilizing section having stabilization function including a phase compensation function adapted to compensate a phase delay relative to a rotational speed signal of a rotor so that said rotational speed signal is in phase with a phase angle signal of said rotor, for computationally determining a stabilizing signal for suppressing power fluctuations according to the rotational speed signal of said rotor, wherein, said stabilizing section includes a plurality of stabilizing sections, each of said plurality of stabilizing sections has a stabilization function including a phase compensation function adapted to compensate the phase delay relative to the rotational speed signal of said rotor so as to match said rotational speed signal to be in phase with the phase angle signal of said rotor, and said stabilization functions of said long-cycle stabilizing sections have respective control constants that are different from each other; and an output section for outputting said stabilizing signal to said excitation control system.

* * * * *